US011479677B2

(12) United States Patent
Zalich et al.

(10) Patent No.: US 11,479,677 B2
(45) Date of Patent: *Oct. 25, 2022

(54) INFRARED FLUORESCENT COATING COMPOSITIONS

(71) Applicants: PPG Industries Ohio, Inc., Cleveland, OH (US); The Regents of the University of California, Oakland, CA (US)

(72) Inventors: Michael A. Zalich, Wexford, PA (US); Michael F. Baxter, New Kensington, PA (US); Paul H. Berdahl, Walnut Creek, CA (US); Stuart D. Hellring, Pittsburgh, PA (US); Jeffrey L. Stalker, Wexford, PA (US)

(73) Assignees: PPG Industries Ohio, Inc., Cleveland, OH (US); The Regents of the University of California, Oakland, CA (US)

( * ) Notice: Subject to any disclaimer, the term of this patent is extended or adjusted under 35 U.S.C. 154(b) by 713 days.

This patent is subject to a terminal disclaimer.

(21) Appl. No.: 16/067,518

(22) PCT Filed: Oct. 28, 2016

(86) PCT No.: PCT/US2016/059488
§ 371 (c)(1),
(2) Date: Jun. 29, 2018

(87) PCT Pub. No.: WO2017/116549
PCT Pub. Date: Jul. 6, 2017

(65) Prior Publication Data
US 2020/0190337 A1    Jun. 18, 2020

Related U.S. Application Data

(60) Provisional application No. 62/272,391, filed on Dec. 29, 2015, provisional application No. 62/272,357, (Continued)

(51) Int. Cl.
| | | |
|---|---|---|
| C09D 5/33 | (2006.01) | |
| C09D 7/62 | (2018.01) | |
| B05D 5/06 | (2006.01) | |
| B05D 7/00 | (2006.01) | |
| C09K 11/02 | (2006.01) | |
| C09K 11/55 | (2006.01) | |
| C09K 11/58 | (2006.01) | |
| C09K 11/59 | (2006.01) | |
| C09D 5/22 | (2006.01) | |
| C09D 127/16 | (2006.01) | |
| C09K 11/06 | (2006.01) | |
| C09K 11/68 | (2006.01) | |
| G01N 21/64 | (2006.01) | |
| C08K 3/013 | (2018.01) | |
| C08K 5/00 | (2006.01) | |

(52) U.S. Cl.
CPC ............ *C09D 5/004* (2013.01); *B05D 5/063* (2013.01); *B05D 7/52* (2013.01); *B05D 7/546* (2013.01); *C09D 5/22* (2013.01); *C09D 7/62* (2018.01); *C09D 127/16* (2013.01); *C09K 11/02* (2013.01); *C09K 11/06* (2013.01); *C09K 11/55* (2013.01); *C09K 11/58* (2013.01); *C09K 11/59* (2013.01); *C09K 11/592* (2013.01); *C09K 11/685* (2013.01); *G01N 21/6428* (2013.01); *C08K 3/013* (2018.01); *C08K 5/0041* (2013.01); *G01N 2021/6439* (2013.01)

(58) Field of Classification Search
CPC ......... C09K 11/02; C09K 11/55; C09K 11/58; C09K 11/59; C09D 5/22; C09D 5/004; B05D 5/063; B05D 7/52
See application file for complete search history.

(56) References Cited

U.S. PATENT DOCUMENTS 3,105,954 A    10/1963  Gill
4,157,924 A    6/1979   Elms et al.
(Continued)

FOREIGN PATENT DOCUMENTS

CA    2309871 A1    12/2000
CN    1836011 A     9/2006
(Continued)

OTHER PUBLICATIONS

Translation for CN 103468044, Dec. 25, 2013.*
(Continued)

*Primary Examiner* — C Melissa Koslow
(74) *Attorney, Agent, or Firm* — Nina A. Reger

(57) ABSTRACT

A coating composition includes: (i) a film-forming resin; (ii) an infrared reflective pigment; and (iii) an infrared fluorescent pigment different from the infrared reflective pigment. When the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment. A multi-layer coating including the coating composition, and a substrate at least partially coated with the coating composition is also disclosed. A method of reducing temperature of an article includes applying the coating composition to at least a portion of the article.

17 Claims, 28 Drawing Sheets

Related U.S. Application Data filed on Dec. 29, 2015, provisional application No. 62/272,377, filed on Dec. 29, 2015.

(56) References Cited

U.S. PATENT DOCUMENTS

| | | | |
|---|---|---|---|
| 4,186,036 A | | 1/1980 | Elms et al. |
| 4,271,358 A | * | 6/1981 | Schwarz ............... G08B 13/19 |
| | | | 250/342 |
| 5,154,768 A | | 10/1992 | Yamada et al. |
| 6,017,981 A | * | 1/2000 | Hugo ..................... C04B 26/02 |
| | | | 523/216 |
| 6,045,656 A | | 4/2000 | Foster et al. |
| 6,521,038 B2 | * | 2/2003 | Yanagimoto ........ C09B 29/0011 |
| | | | 106/31.6 |
| 7,183,000 B2 | | 2/2007 | Hall et al. |
| 7,338,704 B2 | | 3/2008 | Decker et al. |
| 7,384,694 B2 | | 6/2008 | Decker et al. |
| 7,625,973 B2 | | 12/2009 | Ambrose et al. |
| 8,030,396 B2 | | 10/2011 | Ambrose et al. |
| 8,222,313 B2 | | 7/2012 | Iftime et al. |
| 8,679,617 B2 | | 3/2014 | Eibon et al. |
| 8,822,025 B2 | | 9/2014 | Decker et al. |
| 9,056,988 B2 | | 6/2015 | Decker et al. |
| 9,267,052 B1 | * | 2/2016 | Joecken ............... C09D 125/14 |
| 10,927,267 B2 | * | 2/2021 | Zalich et al. |
| 2004/0191540 A1 | | 9/2004 | Jakobi et al. |
| 2005/0035331 A1 | | 2/2005 | Sun |
| 2008/0138609 A1 | | 6/2008 | Walker |
| 2009/0098474 A1 | | 4/2009 | Kim et al. |
| 2009/0286014 A1 | | 11/2009 | Scherer |
| 2010/0047620 A1 | | 2/2010 | Decker et al. |
| 2012/0064134 A1 | | 3/2012 | Bourke, Jr. et al. |
| 2012/0308724 A1 | | 12/2012 | Hellring et al. |
| 2013/0048925 A1 | * | 2/2013 | Edwards ................ C09D 11/50 |
| | | | 252/587 |
| 2013/0209717 A1 | * | 8/2013 | Edwards .................. C09D 7/41 |
| | | | 428/36.91 |
| 2014/0041925 A1 | | 2/2014 | Davis et al. |
| 2014/0072790 A1 | | 3/2014 | Salguero et al. |
| 2014/0342096 A1 | * | 11/2014 | Hsu ..................... C09D 133/02 |
| | | | 427/458 |
| 2015/0004424 A1 | * | 1/2015 | Kruesemann ............ C09D 7/61 |
| | | | 428/523 |
| 2015/0218340 A1 | | 8/2015 | Reddy et al. |
| 2015/0275077 A1 | | 10/2015 | Berdahl |

FOREIGN PATENT DOCUMENTS

| | | | |
|---|---|---|---|
| CN | 1836012 A | | 9/2006 |
| CN | 101605614 A | | 12/2009 |
| CN | 101712831 A | | 5/2010 |
| CN | 103468004 A | | 12/2013 |
| CN | 103468044 | * | 12/2013 |
| CN | 103468044 A | | 12/2013 |
| CN | 104530958 A | | 4/2015 |
| CN | 102712821 B | | 10/2015 |
| DE | 19828129 A1 | | 12/1999 |
| EP | 0719654 A1 | | 7/1996 |
| JP | 201293481 A | | 5/2012 |
| WO | 2011035292 A2 | | 3/2011 |
| WO | 2011035294 A2 | | 3/2011 |
| WO | 2014033726 A1 | | 3/2014 |
| WO | 2015157521 A1 | | 10/2015 |
| WO | WO 2015/157521 | * | 10/2015 |

OTHER PUBLICATIONS

Bray et al., "Long range target discrimination using UV fluorescence", SPIE., 2011, pp. 1-12, vol. 8037: 803702-1.

Choi, "Ancient Egyptian Pigment's Future Now Even Brighter", Inside Science, Reliable News for an Expanding Universe, Mar. 11, 2013.

Fang et al., "A review of near infrared reflectance properties of metal oxide nanostructures", GNS Science Report, Jul. 2013, pp. 1-20, Institute of Geological and Nuclear Sciences Limited.

Fearn, "Preparation and Properties of P-N Molecular Junctions", University of Manchester, 2008, pp. 1-283, ProQuest LLC, Ann Arbor, Michigan.

George, "Synthesis, Characterization and Optical Properties of Rare Earth Based Non-toxic Inorganic Pigments", Cochin University of Science and Technology (CUSTAT), Nov. 2010, pp. 1-103.

Goodfellow Corporation Catalogue, www.goodfellowusa.com, Aug. 10, 2017, pp. 10 and 69.

Levinson et al., "Solar Spectral Optical Properties of Pigments, or . . . How to Design a Cool Nonwhite Coating", Heat Island Group, Lawrence Berkeley National Laboratory, May 12, 2005, pp. 1-13, Atlanta, Georgia.

Levinson et al., "Measuring solar reflectance—Part I: Defining a metric that accurately predicts solar heat gain", Solar Energy, 2010, pp. 1717-1744, vol. 84.

Manning, PCI Magazine, Dynamix Dry Dispersion Technology (2011), available from https://www.pcimag.com/ext/resources/PCI/Home/files/PFDs/Virtual_Supplies_Brochures/shepherd_color.pdf.

Miller et al., "Cool Color Roofs with Complex Inorganic Color Pigments", Residential Buildings: Technologies, Design, Performance Analysis, and Building Industry Trends, pp. 1.195-1.206, US.

O'Leary et al., "Determination of Chromium in Ruby", Journal Mineralogical Society of America, Jan. 1931, pp. 34-36, vol. 16: 1.

Reiss et al., Highly Luminescent CdSe/ZnSe Core/Shell Nanocrystals of Low Size Dispersion, Nano Letters, 2002, pp. 781-784, vol. 2: 7.

Thoury et al., "Near-Infrared Luminescence of Cadmium Pigments: In Situ Identification and Mapping in Paintings", Applied Spectroscopy, 2011, pp. 939-951, vol. 65: 8.

Wake et al., "Formulating Infrared Coatings for Defence Applications", MRL Research Report, 1993, pp. 1-38, DSTO Materials Research Laboratory, Victoria, Australia.

Zalich et al., "Fluorescent Pigments for High-Performance Cool Roofing and Facades", https://www.energy.gov/eere/buildings/downloads/fluorescent-pigments-high-performance-cool-roofing-and-facades, (printed from the internet Dec. 17, 2018), Department of Energy.

"Fluorescence", Molecular Devices, Jun. 2021, pp. 1-15.

* cited by examiner

INFRARED FLUORESCENT COATING COMPOSITIONS

CROSS REFERENCE TO RELATED APPLICATIONS

This application claims priority to U.S. Provisional Application Ser. No. 62/272,391 filed Dec. 29, 2015, U.S. Provisional Application Ser. No. 62/272,357 filed Dec. 29, 2015, and U.S. Provisional Application Ser. No. 62/272,377 filed Dec. 29, 2015, the disclosures of which are each hereby incorporated by reference in their entireties.

STATEMENT REGARDING FEDERALLY SPONSORED RESEARCH

This invention was made with Government support under Contract No. DE-EE-0006347 and Contract No. DE-ACO2-05CH11231 awarded by the Department of Energy. The United States Government may have certain rights in this invention.

FIELD OF THE INVENTION

The present invention relates to a coating composition including a film forming resin, an infrared reflective pigment, and an infrared fluorescent pigment different from the infrared reflective pigment. The present invention also relates to a multi-layer coating composition, a coated substrate, and a method of reducing temperature of an article.

BACKGROUND OF THE INVENTION

For many coating applications in building materials, dark colors, such as black, dark red, and dark blue are particularly desirable for aesthetic purposes. However, dark colored building materials, facades, and roofs are susceptible to absorption of infrared ("IR") radiation. These dark structures reflect insignificant amounts of IR radiation. While IR radiation extends from the nominal red edge of the visible spectrum at 700 nm to 1 mm, near-infrared ("NIR") radiation, i.e., radiation having a wavelength of from 700 to 2500 nm, constitutes about 45% of the solar energy that reaches the earth's surface. As a result, the structures exhibit increased temperatures and become quite hot, particularly on sunny days in warm and hot climates, rendering their occupants uncomfortable. In addition, such buildings are then more expensive to operate and require more energy, since higher levels of air conditioning are required to maintain a certain level of comfort as compared to structures having lighter colors with higher reflectivity. Similarly, transportation vehicles such as aircrafts or automobiles can suffer excessive solar heat gain when coated with dark colors and require more air conditioning to maintain comfortable climate control. In addition, objects made with composites, such as fiber reinforced polymer composites, can suffer mechanical damage from overheating due to solar heat gain and often require lighter colors to maintain composite surface temperatures below a critical operating maximum. Therefore, coating compositions that are able to provide cool coatings with reduced IR absorptance are desirable.

SUMMARY OF THE INVENTION

The present invention is directed to a coating composition including: (i) a film-forming resin; (ii) an infrared reflective pigment; and (iii) an infrared fluorescent pigment different from the infrared reflective pigment. When the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment.

The present invention is also directed to a multi-layer coating including: (i) a first coating layer comprising a cured infrared reflective coating composition; and a second coating layer overlaying at least a portion of the first coating layer. The second coating layer includes a cured coating composition including: (i) a film-forming resin; (ii) an infrared reflective pigment; and (iii) an infrared fluorescent pigment different from the infrared reflective pigment, and when the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment.

The present invention is also directed to a substrate at least partially coated with a coating composition including: (i) a film-forming resin; (ii) an infrared reflective pigment; and (iii) an infrared fluorescent pigment different from the infrared reflective pigment. When the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment.

The present invention is also directed to a method of reducing the temperature of an article including: (a) applying a coating composition to at least a portion of a surface of an article, the coating composition comprising (i) a film-forming resin, (ii) an infrared reflective pigment, and (iii) an infrared fluorescent pigment different from the infrared reflective pigment; and (b) curing the coating composition to form a coating on the article. When the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment.

DESCRIPTION OF THE INVENTION

Figure 1:
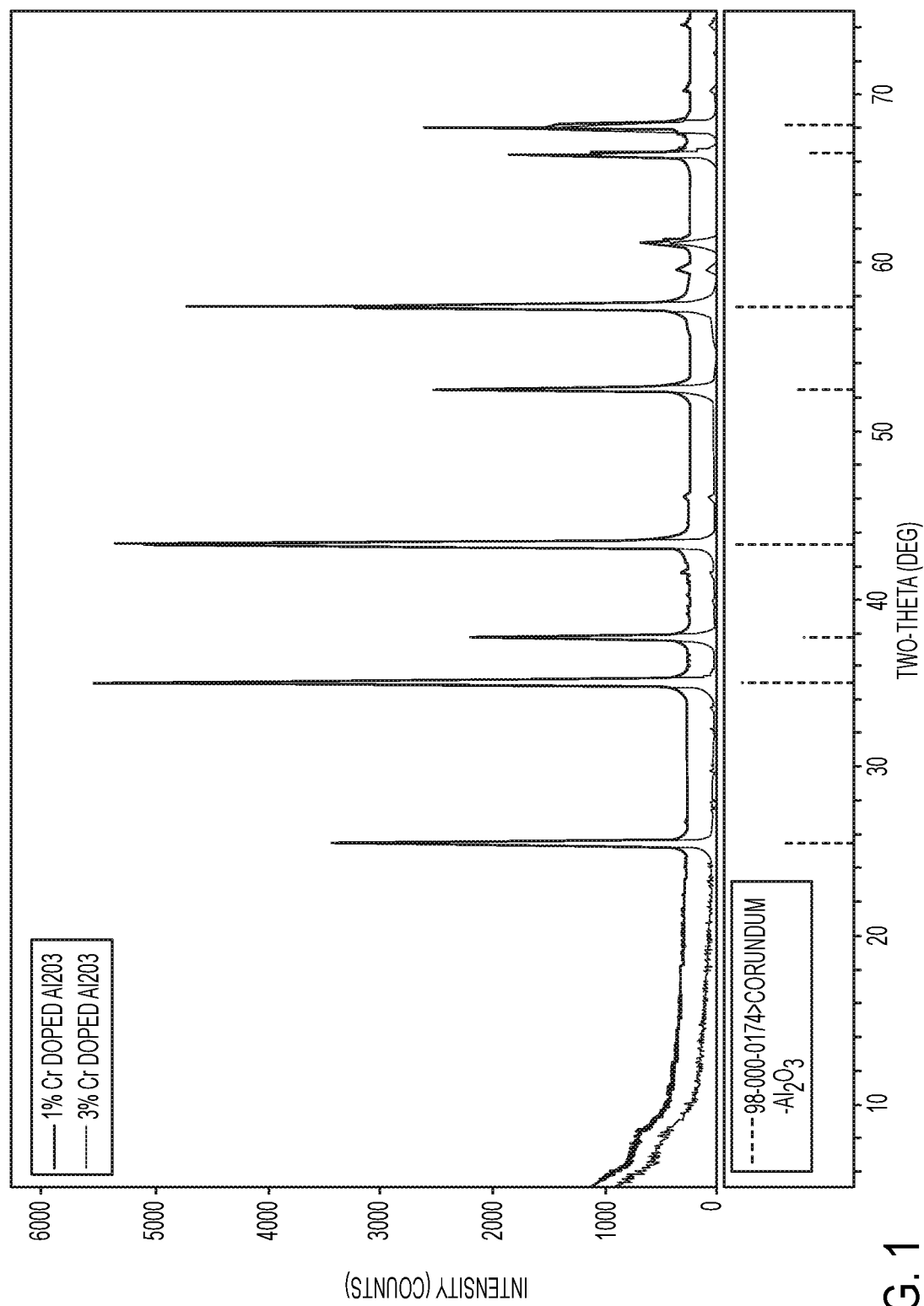
FIG. 1 is a graph showing the X-ray diffraction (XRD) patterns of $Al_2O_3$ doped with 1 wt % $Cr_2O_3$ and 3 wt % of $Cr_2O_3$.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" pigment, "a" film-forming resin, "an" inorganic oxide, and the like refer to one or more of any of these items. Also, as used herein, the term "polymer" is meant to refer to prepolymers, oligomers and both homopolymers and copolymers. The term "resin" is used interchangeably with "polymer." The term "metal" includes metals, metal oxides, and metalloids.

As used herein "wavelength" includes a spectral range of wavelengths, such as a spectral peak having a 25 nm, 50 nm, 75 nm, 100 nm, 125 nm, 200 nm range on both sides of the spectral peak. As such, "wavelength" may refer to a spectral range of wavelengths encompassing up to 50 nm, up to 100 nm, up to 150 nm, up to 200 nm, up to 250 nm, up to 400 nm.

The present invention is directed to a coating composition including a film-forming resin, an infrared ("IR") reflective pigment, and an IR fluorescent pigment different from the IR reflective pigment. When the coating composition is cured to form a coating and exposed to fluorescence-exciting radiation, the coating has a greater effective solar reflectance (ESR) compared to the same coating exposed to the fluorescence-exciting radiation except without the IR fluorescent pigment.

IR Reflective Pigment

The coatings according to the present invention may include one or more IR reflective pigments. As used herein, the term "IR reflective pigment" refers to a pigment that, when included in a curable coating composition, provides a cured coating that reflects IR radiation, such as NIR radiation, greater than a cured coating deposited in the same manner from the same composition but without the IR reflective pigment. As used herein, IR radiation refers to radiation energy having a wavelength ranging from 700 nanometers to 1 millimeter. NIR radiation refers to radiation energy have a wavelength ranging from 700 to 2500 nanometers. The IR reflective pigment may reflect environmental IR radiation as well as radiation produced by the IR fluorescent pigment or dye described below. The coating may comprise the IR reflective pigment in an amount sufficient to provide a cured coating that has a solar reflectance, measured according to ASTM E903-96 in the wavelength range of 700-2500 nm, that is at least 2, or at least 5 percentage points higher than a cured coating deposited in the same manner from the same coating composition in which the IR reflective pigment is not present. Non-limiting examples of IR reflective pigments include inorganic or organic materials. Non-limiting examples of suitable IR reflective pigments include any of a variety of metals and metal alloys, inorganic oxides, and interference pigments. Non-limiting examples of IR reflective pigments include titanium dioxide, titanium dioxide coated mica flakes, iron titanium brown spinel, chromium oxide green, iron oxide red, chrome titanate yellow, nickel titanate yellow, blue and violet. Suitable metals and metal alloys include aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific non-limiting examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium and aluminites, iron oxide, iron cobalt ferrite, iron titanium, zinc ferrite, zinc iron chromite, copper chromite, as well as combinations thereof.

More particularly, commercially available non-limiting examples of IR reflective pigments include RTZ Orange 10C341 (rutile tin zinc), Orange 30C342, NTP Yellow 10C151 (niobium tin pyrochlore), Azo Yellow, Yellow 10C112, Yellow 10C242, Yellow 10C272, Yellow 193 (chrome antimony titanium), Yellow 30C119, Yellow 30C152, Yellow 30C236, Arctic Black 10C909 (chromium green-black), Black 30C933, Black 30C941, Black 30C940, Black 30C965, Black 411 (chromium iron oxide), Black 430, Black 20C920, Black 444, Black 10C909A, Black 411A, Brown 300888, Brown 200819, Brown 157, Brown 100873, Brown 12 (zinc iron chromite), Brown 8 (iron titanium brown spinel), Violet 11, Violet 92, Blue 300588, Blue 300591, Blue 300527, Blue 385, Blue 424, Blue 211, Green 260, Green 223, Green 187B, Green 410, Green 300612, Green 3006054, Green 300678, and mixtures thereof. The IR reflective pigments can be added to the coating composition in any suitable form, such as discrete particles, dispersions, solutions, and/or flakes.

The IR reflective pigments can also be incorporated into the coating composition in any suitable form, e.g., by use of a grind vehicle, such as an acrylic grind vehicle, the use of which will be familiar to one skilled in the art. The IR reflective pigments, if they do not absorb the IR fluorescence emission, can be used to adjust the visible color of the coating composition.

IR Fluorescent Pigment

As previously mentioned, the coating composition of the present invention includes at least one IR fluorescent pigment. As used herein, the term "IR fluorescent pigment" refers to a pigment which fluoresces in the IR region (700 nm-1 mm) of the electromagnetic spectrum. The IR fluorescent pigment may fluoresce in the NIR region (700-2500 nm) of the electromagnetic spectrum. The IR fluorescent pigment may fluoresce at a lower energy wavelength when excited by a higher energy wavelength. For instance, the IR fluorescent pigment may fluoresce in the 700-1500 nm region (a comparatively lower energy wavelength) when excited by radiation in the 300-700 nm region (a comparatively higher energy wavelength).

Non-limiting examples of suitable IR fluorescent pigments include metallic pigments, metal oxides, mixed metal oxides, metal sulfides, metal selenides, metal tellurides, metal silicates, inorganic oxides, inorganic silicates, alkaline earth metal silicates. As used herein, the term "alkaline" refers to the elements of group II of the periodic table Be, Mg, Ca, Sr, Ba, and Ra (beryllium, magnesium, calcium, strontium, barium, radium). Non-limiting examples of suitable IR fluorescent pigments include metal compounds, which may be doped with one or more metals, metal oxides, and alkali and/or rare earth elements. As used herein, the term "alkali" refers to the elements of group I of the periodic table Li, Na, K, Rb, Cs, and Fr (lithium, sodium, potassium, rubidium, cesium, and francium). As used herein, the term "rare earth element" 0 refers to the lanthanide series of elements La, Ce, Pr, Nd, Pm, Sm, Eu, Gd, Tb, Dy, Ho, Er, Tm and Yb (lanthanum, cerium, praseodymium, neodymium, promethium, samarium, europium, gadolinium, terbium, dysprosium, holmium, erbium, thulium, ytterbium).

Non-limiting examples of IR fluorescent pigments include Egyptian blue ($CaCuSi_4O_{10}$), Han blue ($BaCuSi_4O_{10}$), Han purple ($BaCuSi_2O_6$), $SrCuSi_4O_{10}$, ruby ($Al_2O_3$:Cr), Sr(La, Li)$CuSi_4O_{10}$, and Ba(La, Li)$CuSi_4O_{10}$. In particular, blue alkali earth copper silicates, such as Egyptian blue ($CaCuSi_4O_{10}$) fluoresce in the 800 to 1200 nm region. Cadmium pigments, CdSe and CdTe compounds, "zirconia" red (red cadmium pigments coated with a zirconium silicate glass), indigo, blue verditer, copper blue, azurite ($Cu_3(CO_3)_2(OH)_2$), Ploss blue (($CuCa)(CH_3COO)_2 \cdot 2H_2O$), and smalt ($CoO.K.Si$) may possess weak fluorescence.

Other non-limiting examples of IR fluorescent pigments may include ZnO, ZnS, ZnSe, ZnTe, (Zn(O,S,Se,Te). These IR fluorescent pigments have energy gaps that are too large for band-to-band emission of IR energy, but doping with Sn, Mn, and Te can lead to suitable impurity luminescence. Other non-limiting examples of IR fluorescent pigments may include compounds used in lighting and for fluorescent displays; certain direct bandgap semiconductors, such as (Al,Ga)As, InP, and the like; and materials used for solid state lasers, such as Nd doped yttrium aluminum garnet, and titanium doped sapphire. In addition, non-limiting examples of IR fluorescent pigments may include phosphors that emit in the deep red or IR (e.g, $LiAlO_2$:Fe, CaS:Yb).

The IR fluorescent pigment may absorb visible radiation (380-750 nanometers). The absorbed visible radiation may make it such that an individual sees the coating composition including the IR fluorescent pigment as a color, such as a dark color. Non-limiting examples of dark colors include black, blue, purple, green, red, and brown.

The IR fluorescent pigments can be added to the coating composition in any suitable form, such as discrete particles, dispersions, solutions, and/or flakes. The IR fluorescent pigments can also be incorporated into the coatings by use of a grind vehicle, such as an acrylic grind vehicle, the use of which will be familiar to one skilled in the art.

IR Transparent Pigment

The coating composition may also optionally include at least one IR transparent pigment. As used herein, an "IR transparent pigment" refers to a pigment that is substantially transparent (having the property of transmitting energy, e.g. radiation, without appreciable scattering in those wavelengths) in the IR wavelength region (700 nm-1 mm), such as in the NIR wavelength region (700 to 2500 nanometers), such as is described in United States Patent Application Publication No. 2004/0191540 at [0020]-[0026], United States Patent Application Publication No. 2010/0047620 at [0039], United States Patent Application Publication No. 2012/0308724 at [0020]-[0027], the cited portions of which being incorporated herein by reference. The IR transparent pigment may have an average transmission of at least 70% in the IR wavelength region. The at least one IR transparent pigment can be used to adjust the visible color of the coating composition, i.e., may be a colorant. The IR transparent pigment may not be transparent at all wavelengths in the IR range but should be largely transparent in the fluorescent emission wavelength of the IR fluorescent pigment.

The IR reflective pigment may reflect radiation at a first wavelength when exposed to radiation comprising fluorescence-exciting radiation, and the IR fluorescent pigment may fluoresce at a second wavelength when exposed to radiation comprising fluorescence-exciting radiation. The balance of the coating composition (i.e. the remaining components of the coating composition excluding the IR reflective pigment and the IR fluorescent pigment) may be transparent at the first and second wavelength so as not to adversely affect IR reflection or IR fluorescence or not to affect the visible color of the coating composition.

Film-Forming Resin

The present invention includes a film-forming resin including resins based on fluoropolymers (including poly (vinylidene fluoride), PVDF), polyesters, polyacrylates, and/or thermoplastic PVC polymers. As used herein, a "film-forming resin" refers to a resin that can form a continuous film on at least a horizontal surface of a substrate upon removal of any diluents or carriers present in the composition or upon curing. The film-forming resin can include any of a variety of thermoplastic and/or thermosetting film-forming resins known in the art. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions or at low temperatures. Once cured or crosslinked, a thermosetting resin will not melt upon the application of heat and is insoluble in solvents. As noted, the film-forming resin can also include a thermoplastic film-forming resin. As used herein, the term "thermoplastic" refers to resins that include polymeric components that are not joined by covalent bonds and thereby can undergo liquid flow upon heating and are soluble in solvents.

The coating composition(s) described herein can comprise any of a variety of thermoplastic and/or thermosetting compositions known in the art. The coating composition(s) may be water-based or solvent-based liquid compositions, or, alternatively, in solid particulate form, i.e., a powder coating.

Thermosetting coating compositions typically comprise a crosslinking agent that may be selected from, for example, melamines, polyisocyanates, polyepoxides, beta-hydroxyalkylamides, polyacids, anhydrides, organometallic acid-functional materials, polyamines, polyamides, alkoxysilanes, and mixtures of any of the foregoing.

In addition to or in lieu of the above-described crosslinking agents, the coating composition may comprises at least one film-forming resin. Thermosetting or curable coating compositions may comprise film forming polymers having functional groups that are reactive with the crosslinking agent. The film-forming resin in the coating compositions described herein may be selected from any of a variety of polymers well-known in the art. The film-forming resin can be selected from, for example, fluoropolymers, polyester polymers, silicone modified polyester polymers, acrylic polymers, acrylic latex polymers, vinyl polymers, copolymers thereof, and mixtures thereof. Generally these polymers can be any polymers of these types made by any method known to those skilled in the art. Such polymers may be solvent borne or water dispersible, emulsifiable, or of limited water solubility. Appropriate mixtures of film-forming resins may also be used in the preparation of the coating compositions described herein.

Non-limiting examples of suitable fluoropolymers film-forming resins include perfluoroalkoxy tetrafluoroethylene copolymer (PFA), ethylenechlorotrifluoroethylene (E-CTFE), ethylenetetrafluoroethylene (E-TFE), poly(vinylidene fluoride) (PVDF), poly(tetrafluoroethylene), poly (vinyl fluoride), poly(trifluoroethylene), poly(chlorotrifluoroethylene) (CTFE), poly(hexafluoropropylene), polymers having alternating fluoroethylene and alkyl vinyl ether segments (FEVE), and/or mixtures thereof. Non-limiting examples of vinyl polymers film-forming resins include thermoplastic polyvinyl chloride (PVC) polymers. Any dispersible resin that is compatible with the fluoropolymers can be used to prepare dispersions of the fluoropolymer film-forming resins. Suitable dispersible resins include, for example, those comprising an acrylic, poly(vinyl acetate), poly(vinyl methyl ketone), polybutadiene and/or poly(urethane). Suitable acrylic monomers include one or more of t-butylamino methyl (meth)acrylate, (meth)acrylic acid, methyl (meth)acrylate, ethyl (meth)acrylate, butyl (meth) acrylate, hydroxyethyl (meth)acrylate, hydroxybutyl (meth) acrylate, hydroxypropyl (meth)acrylate and mixtures thereof. It will be appreciated that "(meth)acrylate" and like terms refers to both methacrylate and acrylate, as is conventional in the art. The fluoropolymer can be added or mixed by any means standard in the art, such as by using a Cowles mixer, a media mill, a rotor-stator mill and the like, until the desired particle size is achieved. The amount of fluoropolymer in the dispersion can range from 30 to 99 weight percent, based on total solid weight of the dispersion. The fluoropolymer will typically be mixed with the dispersible resin until the dispersion is substantially homogenous. The mixture can then be dried according to any means known in the art. Particularly suitable methods for drying are spray drying, tray drying, freeze drying, fluid bed drying, single and double drum drying, flash drying, swirl drying, and numerous other evaporation techniques, the use of all of which will be familiar to those skilled in the art. The dry mixture can then be ground to a desired particle size. Grinding can be accomplished by any means known in the art, such as through the use of a classifying mill. Median particle sizes of 20 to 50 microns are often desired for certain applications, such as 30 to 40 microns. A crosslinker can be further added to the dispersion. The crosslinker can be any crosslinker suitable for reaction with a reactive group on the dispersing resin and/or itself. The crosslinker can be in solid or liquid form. Non-limiting examples include hydroxyalkyl amides, such as those commercially available from EMS as PRIMID, glycidyl functional acrylics, triglycidylisocyanurate, carbodiimides, such as those commercially available from Dow Chemical Company (Midland, Mich.) as UCARLINK, melamines, such as those available from Cytec as CYMEL, and blocked isocyanates such as those available from Bayer AG (Leverkusen, Germany) as CRELAN.

The film-forming resin can be water dispersible. As used herein, a "water dispersible" resin is a polymer or oligomer that is solubilized, partially solubilized and/or dispersed in some quantity of water with or without additional water soluble solvents. The solution can be substantially 100 percent water. The solution can be 50 percent water and 50 percent co-solvent, 60 percent water and 40 percent co-solvent, 70 percent water and 30 percent co-solvent, 80 percent water and 20 percent co-solvent, or 90 percent water and 10 percent co-solvent. Suitable co-solvents include, for example, glycol ethers, glycol ether-esters, alcohols, ether alcohols, N-methyl pyrrolidone, phthalate plasticizers and/or mixtures thereof. In certain applications, it may be desirable to limit the amount of co-solvent.

The film-forming resin can also be solvent dispersible. As used herein, a "solvent dispersible" resin is a polymer or oligomer that is solubilized, partially solubilized and/or dispersed in some quantity of a solvent other than water. Suitable solvents include, but are not limited to, aliphatic hydrocarbons, aromatic hydrocarbons, ketones, esters, glycols, ethers, ether esters, glycol ethers, glycol ether esters, alcohols, ether alcohols, phthalate plasticizers. Ketones include isophorone, N-methyl pyrrolidone and/or suitable mixtures thereof. Phthalate plasticizers include phthalates esters such as diethylhexyl phthalate, diisononyl phthalate, diisodecyl phthalate, dioctyl phthalate, and butyl benzyl phthalate. Appropriate mixtures of film-forming resins may also be used in the preparation of the present coating compositions.

When the coating composition is cured to form a coating and exposed to fluorescence-exciting radiation, the coating may have a greater effective solar reflectance (ESR) compared to the same coating exposed to the fluorescence-exciting radiation except without the IR fluorescent pigment. Certain methods of measuring solar reflectance fail to detect fluorescence. However, ESR takes into account any benefit of radiation energy exiting the coating from the fluorescence of a coating. ESR may be determined by calibrating non-fluorescent samples prepared using a mixture of white and black paint on a substrate, such as a metal substrate. Solar reflectance may then be plotted against the percent of black paint in the white coating. The solar reflectance in this plot may be determined using a spectrometer. Temperature measurements may then be taken out in the sun and the panel temperature plotted against time. Solar absorptance $\alpha$ of an unknown fluorescent sample may then be determined from this information by interpolation. ESR for the unknown fluorescent sample may be determined according to the following equation: $ESR = 1 - \alpha$.

The coating composition, when cured to form a coating and exposed to fluorescence-exciting radiation, may have an ESR of at least 0.25, such as at least 0.3, 0.35, 0.4, 0.45, 0.5, 0.55, 0.6, 0.65, 0.7, 0.75, 0.8, 0.85, 0.9. In addition, a temperature at a time ($t_1$) after being exposed to the fluorescence-exciting radiation may be lower compared to the same coating exposed to the fluorescence-exciting radiation except without the IR fluorescent pigment at the time ($t_1$) after being exposed to the fluorescence-exciting radiation.

The fluorescence exciting radiation may be produced from any suitable source. Fluorescence-exciting radiation may include sunlight, incandescent light, fluorescent light, xenon light, laser, LED light, or a combination thereof. The fluorescence-exciting radiation may be sunlight hitting a building material, such as a roof panel, during a sunny day.

The coatings may be prepared by direct incorporation of the dry IR fluorescent pigments and/or the dry IR reflective pigments and/or IR transparent pigments into the coating. The IR florescent pigments may be added as a formulated tint designed to optimize pigment dispersion properties. A salient property of all resins is that they are chosen from a group that is largely transparent at the emission wavelength of the IR fluorescent pigment.

The IR fluorescent pigments and/or the IR reflective pigments and/or IR transparent pigments may be incorporated into the coating composition via one or more pigment dispersion. As used herein, "pigment dispersion" refers to a composition of pigment in a grinding resin (which may be the same as or different from the film-forming resin described earlier). The pigment dispersion may, but does not necessarily need to, include a pigment dispersant. The pigment dispersions containing pigment particles are often milled in a high energy mill in an organic solvent system, such as butyl acetate, using a grinding resin (such as a film-forming resin and/or a pigment dispersant).

The grinding resin is often present in the pigment dispersion in an amount of at least 0.1 percent by weight, such as at least 0.5 percent by weight, or at least 1 percent by weight, based on the total weight of the dispersion. The grinding resin is also often present in the pigment dispersion in an amount of less than 65 percent by weight, or less than 40 percent by weight, based on the total weight of the dispersion. The amount of grinding resin present in the pigment dispersion may range between any combinations of these values, inclusive of the recited values.

The film-forming resin can comprise at least 0.05 weight %, at least 0.1 weight %, at least 0.5 weight %, or at least 1 weight %, based on the total solids weight of the composition. The film-forming resin can comprise up to 90 weight %, up to 70 weight %, or up to 60 weight %, based on the total solids weight of the composition.

The IR fluorescent pigments can comprise at least 0.05 weight %, at least 0.1 weight %, at least 0.5 weight or at least 1 weight %, based on the total solids weight of the composition. The IR fluorescent pigments can comprise up to 50 weight %, up to 40 weight %, or up to 30 weight %, based on the total solids weight of the composition.

The IR reflective pigments can comprise at least 0.05 weight %, at least 0.1 weight %, at least 0.5 weight or at least 1 weight %, based on the total solids weight of the composition. The IR reflective pigments can comprise up to 50 weight %, up to 40 weight %, or up to 30 weight %, based on the total solids weight of the composition.

The IR fluorescent pigments have an average particle size of no more than 10 microns, no more than 1 micron, or no more than 750 nm. In particular, the IR fluorescent pigments may have an average particle size of from 50 nm to 10 microns. In particular, the IR fluorescent pigments may have an average particle size of from 100 nm to 1 micron, such as from 500 nm to 750 nm. A dispersion containing the IR fluorescent pigments is substantially free of pigments having an average particle size of more than 10 microns, no more than 1 micron, or no more than 750 nm. By "substantially free" it is meant that no more than 10% by weight, such as no more than 5% by weight, or no more than 1% by weight, of the IR fluorescent pigments present in the dispersion have an average particle size of more than 10 microns, no more than 1 micron, or no more than 750 nm. The IR reflective pigments have an average particle size of no more than 10 microns, no more than 1 micron, or no more than 750 nm. A dispersion containing the IR reflective pigments are substantially free of pigments having an average particle size of more than 10 microns, no more than 1 micron, or no more than 750 nm.

The present invention is further directed to methods for preparing coatings comprising blending a first dispersion of the film-forming resin and a second dispersion comprising one or more IR fluorescent pigments. The second dispersion may also comprise one or more IR reflective pigments and optionally one or more IR transparent pigments. Alternatively, the method may also comprise blending into the first and second dispersion blends a third dispersion comprising one or more IR reflective pigments and/or one or more IR transparent pigments. The final dispersion blend may then be dried. If desired, the dried blend can then undergo grinding. The drying and grinding are as described above. Blending can be done by any means known in the art, such as mixing with a low shear mixer or by shaking. One or both dispersions can be automatically dispensed from a computerized dispensing system. For example, to a first film-forming resin dispersion can be added a second pigment dispersion, or a combination of second pigment dispersion(s) and third pigment dispersion(s) to achieve the desired color. The correct amount and type of second and third pigment dispersion(s) to add to the film-forming resin dispersion can be determined, for example, by use of color matching and/or color generating computer software known in the art.

The first dispersion of the film-forming resin may comprise fluoropolymers, polyesters, polyacrylates, and/or thermoplastic PVC polymers.

The second dispersion comprising an IR fluorescent pigment (and optionally an IR reflective pigment and/or IR transparent pigment) can comprise the same dispersible resin as the first dispersion, or a different dispersible resin. If different dispersible resins are used, they should be selected so as to be compatible both with each other. Both the first and second dispersions can be water based, or both can be solvent based, or one can be water based and one can be solvent based. "Water based" means that the dispersion includes a water dispersible resin; "solvent based" means that the dispersion includes a solvent dispersible resin. The water-based dispersion can include a limited amount of water-soluble solvents to improve application and film forming performance.

The third dispersion comprising an IR reflective pigment and/or IR transparent pigment can comprise the same dispersible resin as the first and/or second dispersion, or a different dispersible resin. If different dispersible resins are used, they should be selected so as to be compatible both with each other, and with the film-forming resin. The first, second, and third dispersions can be water based, or they can be solvent based, or one or two can be water based and one or two can be solvent based. "Solvent based" means that the dispersion includes a solvent dispersible resin.

The IR fluorescent pigment(s), and/or IR reflective pigment(s), and/or IR transparent pigment(s) can be added to the dispersion(s) in the same manner as the reactants that form a polymer in the film-forming resin. The amount of colorant in the dispersion can be any amount that imparts the desired color, such as from 0.5 to 50 weight percent, based on the total weight of the reactants.

As described above, any of the dispersions can be water-based. Similarly, the medium of any of the dispersions can be substantially 100 percent water, or can be 50 percent water and 50 percent co-solvent, 60 percent water and 40 percent co-solvent, 70 percent water and 30 percent co-solvent, 80 percent water and 20 percent co-solvent, or 90 percent water and 10 percent co-solvent, as described above.

It may be desired to partially or wholly neutralize any acid functionality on the film-forming resin. Neutralization can assist in the preparation of a water based dispersion. Any suitable neutralizing agent can be used, such as triethyl amine, triethanol amine, dimethyl ethanolamine, methyl diethanolamine, diethyl ethanolamine, diisopropyl amine, and/or ammonium hydroxide.

It may also be desirable to include a crosslinker in either or both of the dispersions. Any of the crosslinkers described above can be used.

It may be desirable to ensure that the proper spectral response and/or color for the coating is achieved. This can be done by doing, for example, a drawdown or spray out of the blended dispersions to see if the appropriate spectral response and/or color is obtained. If not, more of the pigment dispersion(s) or more of the film-forming resin dispersion can be added to adjust the color accordingly. The adjusted blend can then be dried, or it can be further tested to confirm that the desired color is achieved.

The coating composition may further include a colorant. The colorant may include further pigments, dyes, tints, including but not limited to those used in the paint industry and/or listed in the Dry Color Manufacturers Associate (DCMA) as well as special effect compositions. A colorant may include, for example, a finely divided solid powder that is insoluble but wettable under the conditions of use. A colorant may be organic or inorganic and can be agglomerated or non-agglomerated. The colorant can be in the form of a dispersion including, but not limited to, a nanoparticle dispersion. Nanoparticle dispersions can include one or more highly dispersed nanoparticle colorants or colorant particles that produce a desirable visible color and/or opacity and/or visual effect. Nanoparticle dispersions can include colorants such as pigments or dyes having a particle size less than about 150 nm, such as less than 70 nm, or less than 30 nm.

Any additives standard in the coatings art can be added to any of the dispersions described above. This includes, for example, fillers, extenders, UV absorbers, light stabilizers, plasticizers, surfactants, wetting agents, defoamers and the like. In formulating the dispersions described above, it may also be desirable to add additional dispersible resins the same as or compatible with that in which either of the pigment or film-forming resin polymer is dispersed in order to adjust the level of film-forming resin polymer or pigment.

The present invention is also directed to a substrate at least partially coated with a coating prepared from the coating composition including at least one IR fluorescent pigment, IR reflective pigment, optional IR transparent pigment, and film-forming resin based on fluoropolymers, polyester polymers, silicone modified polyester polymers, acrylic polymers, acrylic latex polymers, vinyl polymers, copolymers thereof, and mixtures thereof. In non-limiting examples, the coating composition can be applied to the substrate as a topcoat or an undercoat. It should be understood that the use of coatings containing IR fluorescent and IR reflective pigments may require that any additional coatings applied on top of the coatings containing IR fluorescent and IR reflective pigments should absorb very weakly in the IR, not absorb in the IR and/or if the coatings are colored, contain IR transparent pigments.

The coating compositions described above are also suitable for use in, for example, multi-component composite coating systems, for example, as a primer coating or as a pigmented base coating composition in a color-plus-clear system, or as a monocoat topcoat. The foregoing coating compositions can be used to form a topcoat in a multi-component composite coating system that further comprises an IR reflective coating layer underlying at least a portion of the topcoat. As will be appreciated, various other coating layers may be present as previously described, such as, for example, a colorless clearcoat layer which may be deposited over at least a portion of the topcoat. In addition, one or more coating layers may be deposited between the topcoat and the IR reflective coating layer underlying the topcoat, optionally with these coatings not absorbing in the IR. Moreover one or more coating layers may be deposited between the substrate and the IR reflective coating layer underlying at least a portion of the topcoat, such as, for example, various corrosion resisting primer layers, including, without limitation, electrodeposited primer layers as are known in the art. The clear coat may be designed to further improve durability of the IR fluorescent coating, such as resistance to UV propagated to photooxidation.

A multi-layer coating may include a first coating layer including a cured IR reflective coating composition. A second coating layer may overlay at least a portion of the first coating layer, and the second coating layer may be the coating composition including the film-forming resin, IR reflective pigment, and IR fluorescent pigment. The first coating layer, being an IR reflective coating, may reflect the fluorescence exhibited by the IR fluorescent pigment of the second coating layer away from the coated substrate.

The substrate upon which the coatings (e.g., the cured coating composition or the multi-layer coating) described above may be deposited may take numerous forms and be produced from a variety of materials. The coating composition of the present invention can be applied to building substrates, such as exterior panels and roofing materials, industrial substrates, and the like. These substrates can be, for example, metallic or non-metallic. Metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN™, GALVALUME™, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable. The metallic substrates can also further comprise a metal pretreatment coating or conversion coating. Non-limiting examples of suitable pretreatment coatings or conversion coatings include, but are not limited to, zinc phosphate, iron, phosphate, or chromate-containing pretreatments. Other non-limiting examples of suitable pretreatment coatings or conversion coatings include, but are not limited to, thin-film pretreatment coatings such as a zirconium or titanium-containing pretreatment. The metal pretreatment coating can also include a sealer, such as a chromate or non-chromate sealer. Non-metallic substrates may be polymeric including plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), polyamide, or may be wood, veneer, wood composite, particle board, medium density fiberboard, cement, stone, glass, paper, cardboard, textiles, leather, both synthetic and natural, and the like. Non-metallic substrates may also include a treatment coating that is applied before application of the coating, which increases the adhesion of the coating to the substrate.

The coating compositions from which each of the coatings described above is deposited can be applied to a substrate by any of a variety of methods including dipping or immersion, spraying, intermittent spraying, dipping followed by spraying, spraying followed by dipping, brushing, or roll-coating, among other methods. The coating compositions may be applied by roll-coating and, accordingly, such compositions often have a viscosity that is suitable for application by roll-coating at ambient conditions. In particular, for roll coating applications, coating compositions with film-forming resins including fluorocarbons conventionally may contain isophorone and/or cyclohexanone as solvents.

After application of a coating composition to the substrate, it is allowed to coalesce to form a substantially continuous film on the substrate. As used herein, "coalescence" refers to the process by which solvents are removed prior to curing. During the curing, the polymer may crosslink with a crosslinker at temperatures ranging from ambient temperatures to high temperatures. "Ambient temperatures," for the purposes of the present invention, include temperatures from about 5° C. to about 40° C. Typically, the film thickness will be 0.01 to 150 mils (about 0.25 to 3000 microns), such as 0.01 to 5 mils (0.25 to 127 microns), or 0.1 to 2 mils (2.54 to 50.8 microns) in thickness. A method of forming a coating film includes applying a coating composition to the surface of a substrate or article to be coated, coalescing the coating composition to form a substantially continuous film and then curing the thus-obtained coating. Curing of these coatings can comprise a flash at ambient or elevated temperatures followed by a thermal bake. Curing can occur at ambient temperature of 20° C. to 250° C., for example.

Any of the coating compositions described herein can include additional materials. Non-limiting examples of additional materials that can be used with the coating compositions of the present invention include plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic co-solvents, reactive diluents, catalysts, reaction inhibitors, and other customary auxiliaries. The coatings compositions of the present application may be used in any coating design for any durable exterior application.

A method of reducing the temperature of an article may include applying a coating composition to at least a portion of a surface of an article, the coating composition comprising (i) a film-forming resin, (ii) an IR reflective pigment, and (iii) an IR fluorescent pigment different from the IR reflective pigment. The method also includes curing the coating composition to form a coating on the article. When the coating composition is cured to form a coating and exposed to fluorescence-exciting radiation, the coating has a greater effective solar reflectance (ESR) compared to the same coating exposed to the fluorescence-exciting radiation except without the IR fluorescent pigment. The article may be any of the previously described substrates, such as a building substrate. The coating composition may be any of the previously described coating compositions or the previously described multi-layer coating may coat the article.

The following examples are presented to demonstrate the general principles of the invention. The invention should not be considered as limited to the specific examples presented. All parts and percentages in the examples are by weight unless otherwise indicated.

Example 1

Synthesis of Red Pigments Via Combustion Synthesis and Analyses

Figure 2:
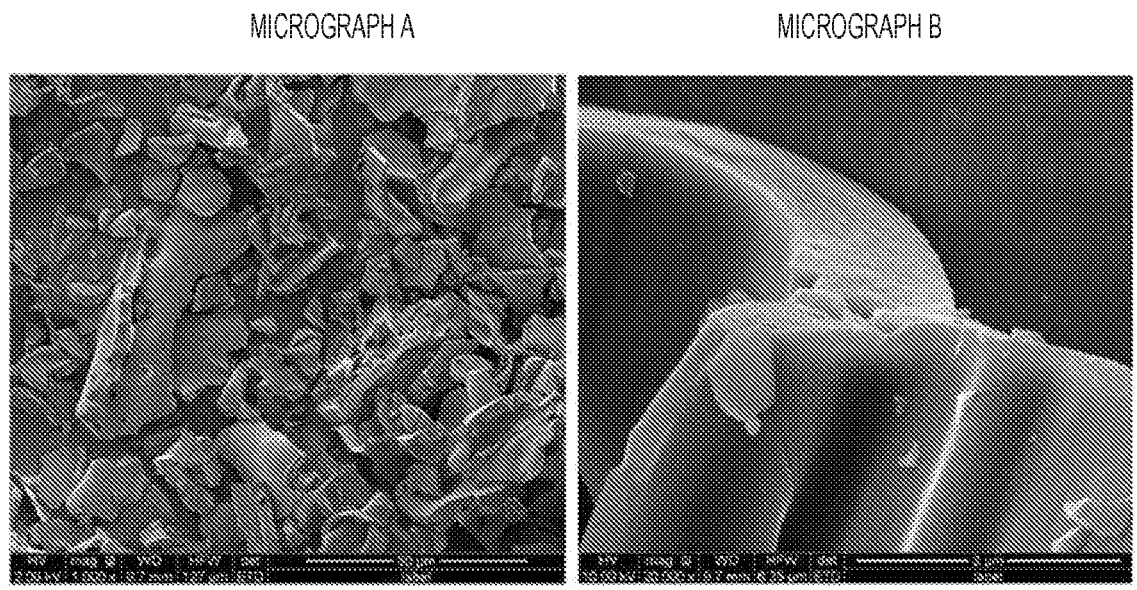
FIG. 2 shows micrographs of two different $Al_2O_3$:Cr pigments obtained by scanning electron microscopy (SEM)

Samples of $Al_2O_3$ (4 g, 16 g, and 200 g) doped with 1 wt % $Cr_2O_3$ or 3 wt % of $Cr_2O_3$ were synthesized via a combustion synthesis method. Analytical testing was conducted on two samples of dark red pigments $Al_2O_3$ doped with 1 wt % $Cr_2O_3$ and $Al_2O_3$ doped with 3 wt % of $Cr_2O_3$. X-ray fluorescence (semi-quantitative) indicated that the elemental compositions of the pigments were close to their expected values. X-ray diffraction XRD patterns of the two samples showed the presence of $\alpha$-$Al_2O_3$, which is the desired phase of $Al_2O_3$ for NIR fluorescence. In addition, the narrow peaks in the XRD patterns suggested the presence of large crystalline particles (FIG. 1). Scanning electron microscopy (SEM) was employed to observe the particle size and morphology of the pigment samples prepared by combustion synthesis (FIG. 2, micrograph B). Micrographs indicated the presence of large particles (FIG. 2, micrograph A). During the combustion synthesis of the dark red pigments, a green byproduct ($\gamma$-alumina) was formed and removed. In addition, the pigments obtained from the combustion synthesis procedure were pink. These pigments become redder as the particle size is increased. High resolution spectral reflectance measurements showed a sharp absorption doublet at fluorescence wavelengths of 692.7 and 694.0 nm.

Example 2

Testing Methods

Three calibration panels (whose spectral reflectance values were measured using a Perkin Elmer Lamda 900 UV-Vis-NIR spectrometer) were placed onto a support along with an experimental sample. The surface temperatures were measured with an IR thermometer and plotted versus time. The effective solar absorptance for the experimental sample was interpolated from the solar absorptance values for the calibrated samples. The effective solar reflectance (ESR) was then calculated using the formula: ESR=1−effective solar absorptance (a).

Figure 3:
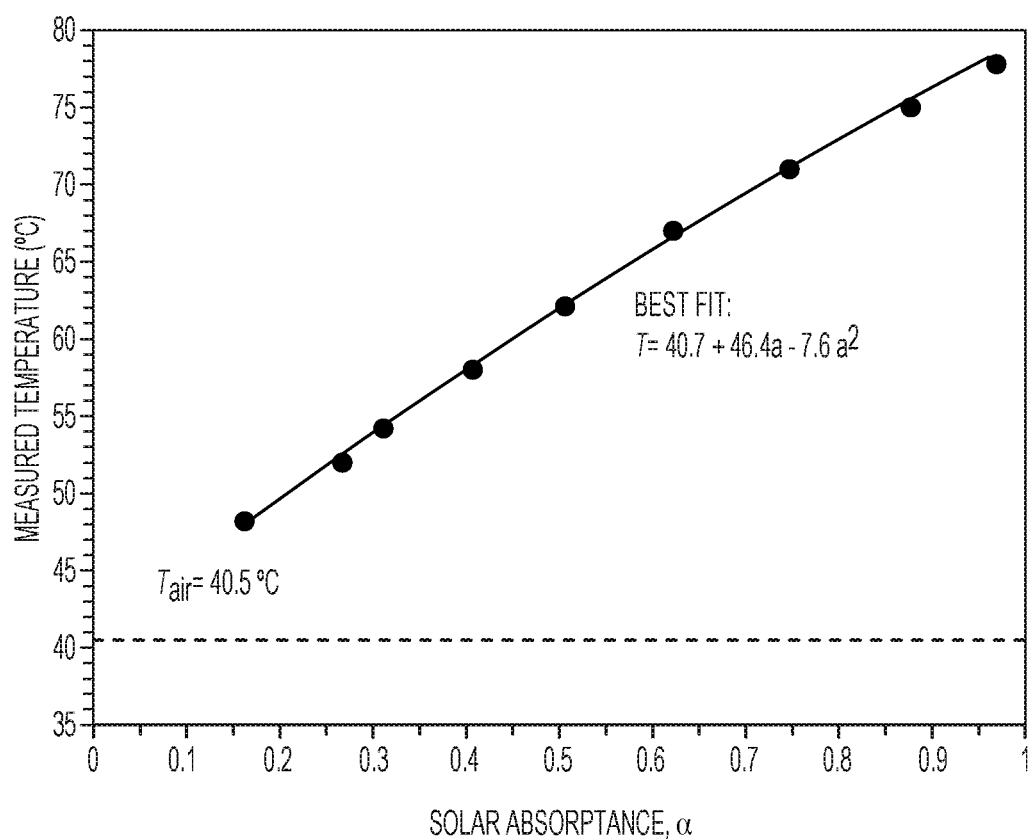
FIG. 3 shows a plot of the surface temperatures versus time of calibration panels.

FIG. 3 shows a plot of the temperature rise when all of the standard reference samples are used at the same time. These measurements were taken on a clear summer day, near noon. They show that the sunlit temperature, as a function of spectrometer-measured solar absorptance a, is slightly non-linear. This shows that the basic function of temperature vs. absorptance $\alpha$ has negative curvature.

Figure 4:
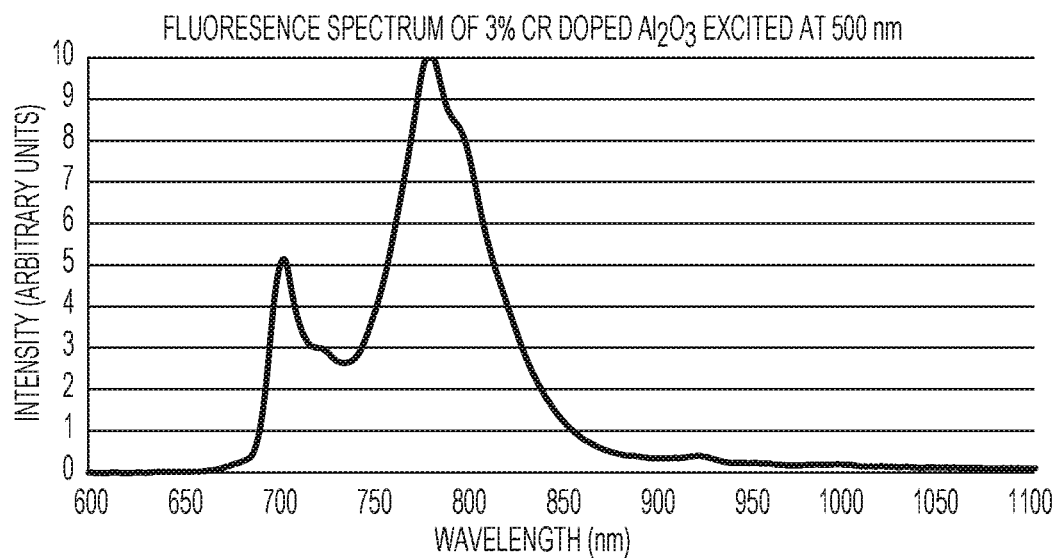
FIG. 4 shows a fluorescence spectra for 3 wt % $Cr_2O_3$ doped $Al_2O_3$ pigments excited at 500 nm.
Figure 5:
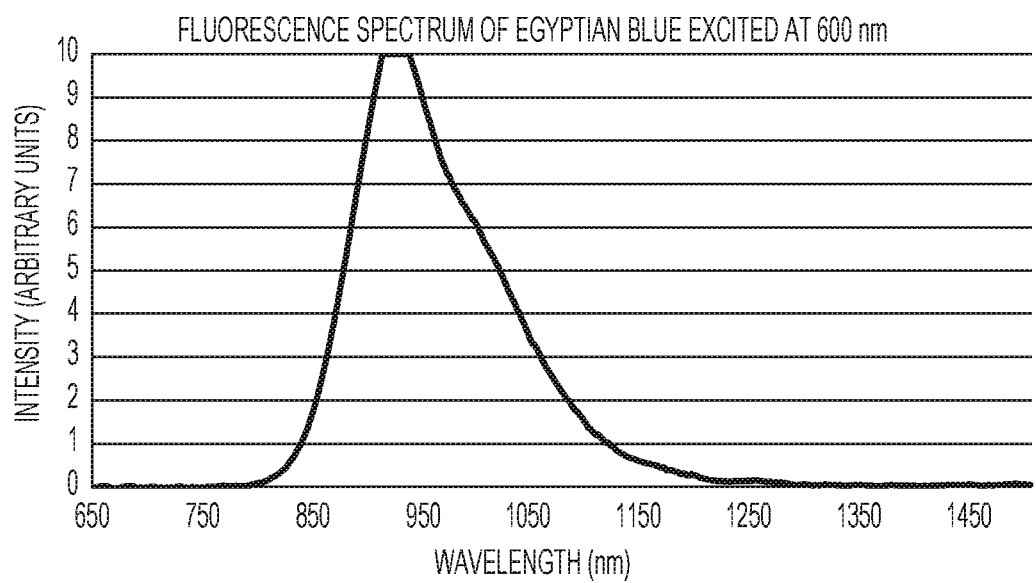
FIG. 5 shows a fluorescence spectra for Egyptian blue pigments excited at 600 nm.

Measurement of the fluorescence of the pigments and pigmented coatings was performed using a MR spectrofluorometer, which was equipped with an InGaAs detector (capable of measurements from 500-1700 nm). Several measurements were conducted on Cr:$Al_2O_3$ and Egyptian blue ($CaCuSi_4O_{10}$) pigments. FIG. 4 shows the fluorescence spectra for 3 wt % $Cr_2O_3$ doped $Al_2O_3$ pigments excited at 500 nm and FIG. 5 shows the fluorescence spectra for Egyptian blue pigments excited at 600 nm.

Figure 6A:
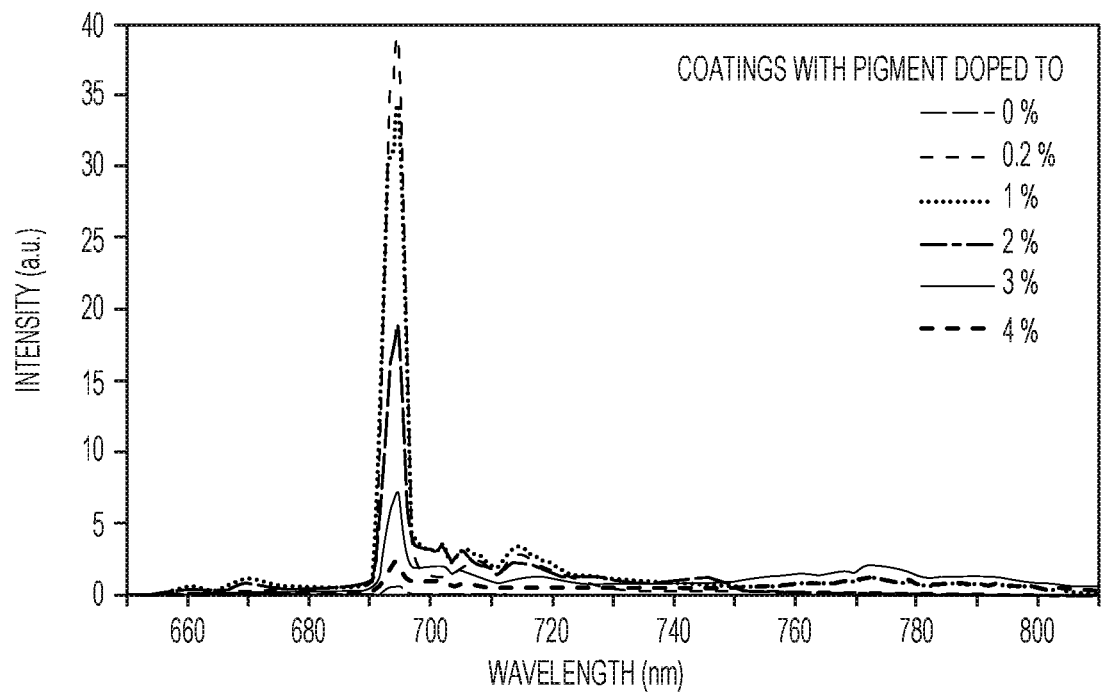
FIGS. 6A and 6B are graphs showing fluorescence spectra of highly-pigmented coatings with 500 g/m² of 0 to 3 wt % $Cr_2O_3$ doped $Al_2O_{30}$ btained with NIR spectrofluorometers.
Figure 6B:
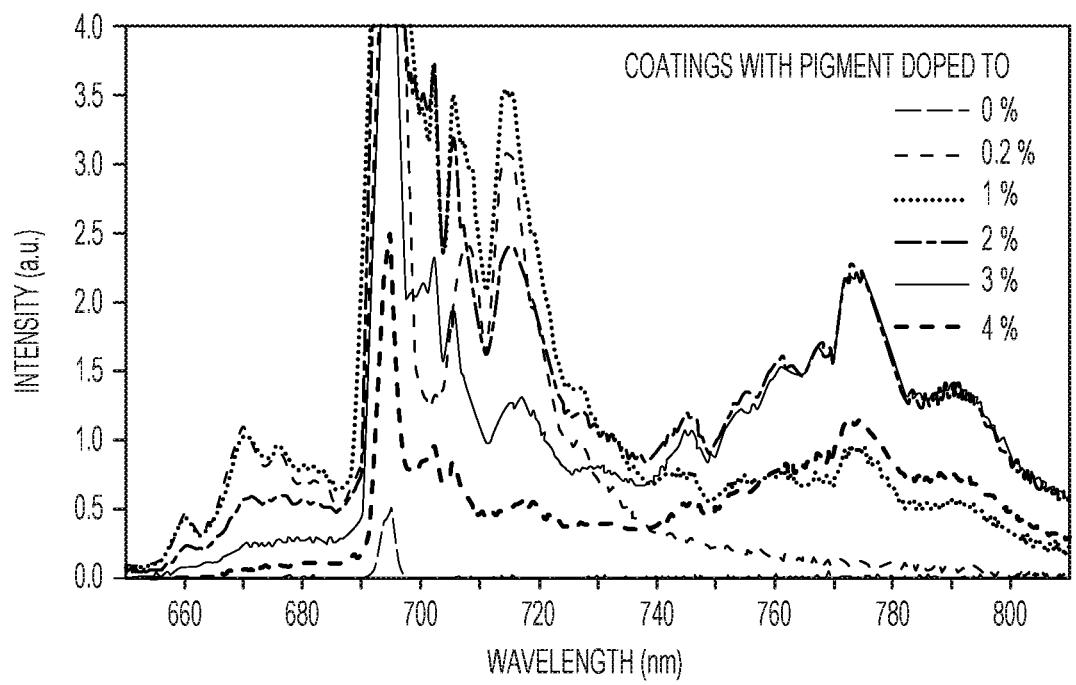

FIGS. 6A and 6B are graphs showing the fluorescence spectra of coatings over white substrate pigmented with 500 g/m$^2$ of 0 to 4 wt % $Cr_2O_3$ doped $Al_2O_3$. The nominal 0% pigment contains a trace of Cr. The spectra were obtained with a spectrofluorometer based on a 150 mm Spectralon integrating sphere and a miniature monochromator with a silicon array detector. A monochromator from Ocean Optics (Dunedin, Fla.) was refitted with a new diffraction grating, a narrower slit and a new silicon array detector.

Example 3

Coatings Including Red Pigment

Coatings based on PVDF including 500 g/m$^2$ of $Al_2O_3$ doped with $Cr_2O_3$ pigments were synthesized via the combustion process described above (particle size of several microns). These coatings had a reflectance of 0.31 at 550 nm. Thinner coatings with 100 g/m$^2$ of $Al_2O_3$ doped with $Cr_2O_3$ synthesized via the combustion process described above had a reflectance of 0.38 at 550 nm.

Additionally, $Al_2O_3$ doped with 1.5 wt % and 4.5 wt % $Cr_2O_3$ pigments with an average particle size of 650 nm were prepared. Egyptian blue pigments were also prepared with an average particle size of 650 nm. These pigments were included into a coating based on a PVDF film-forming resin. Effective solar reflectance (ESR) measurements were made on the coatings made using these pigments and are shown in Table 1. The substrates utilized for the evaluation of the coatings were aluminum substrates coated with a yellow chrome primer.

TABLE 1

ESR measurements for samples

| Pigment included in coating | ESR | Spectrometer (air mass 1, global spectrum) | Spectrometer (550 nm) |
|---|---|---|---|
| $Al_2O_3$ doped pigment (1% $Cr_2O_3$) | 0.576 | 0.580 | 0.57 |
| $Al_2O_3$ doped pigment (4.5% $Cr_2O_3$) | 0.542 | 0.554 | 0.46 |
| Egyptian blue | 0.470 | 0.466 | 0.50 |

Example 4

NIR Spectra of Coatings Including Blue, Purple, Yellow, Orange and Red Pigments

Figure 7:
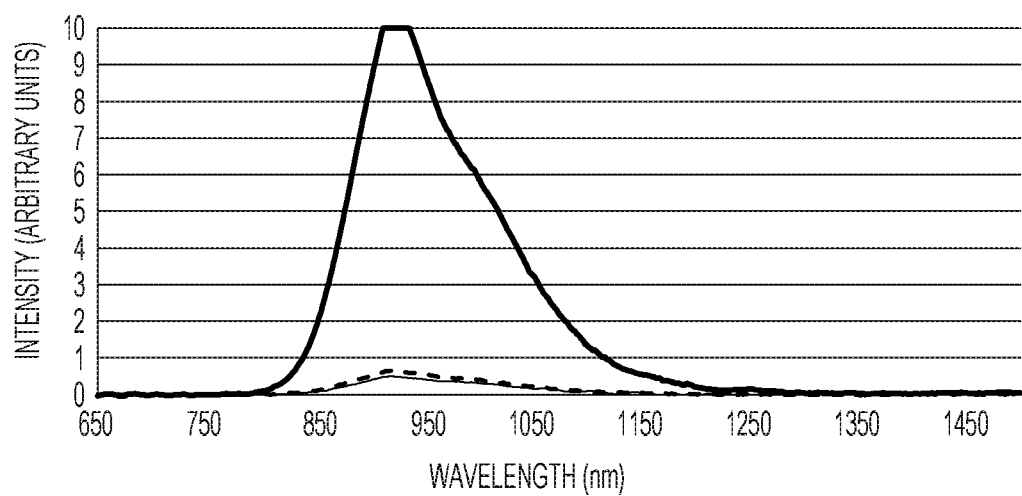
FIG. 7 is a graph showing the fluorescence spectra for a) an Egyptian blue pigment, b) a 0.14 P:B Egyptian blue coating over chrome primed aluminum substrate and c) a 0.4 P:B Egyptian blue coating over a chrome primed aluminum substrate.
Figure 8:
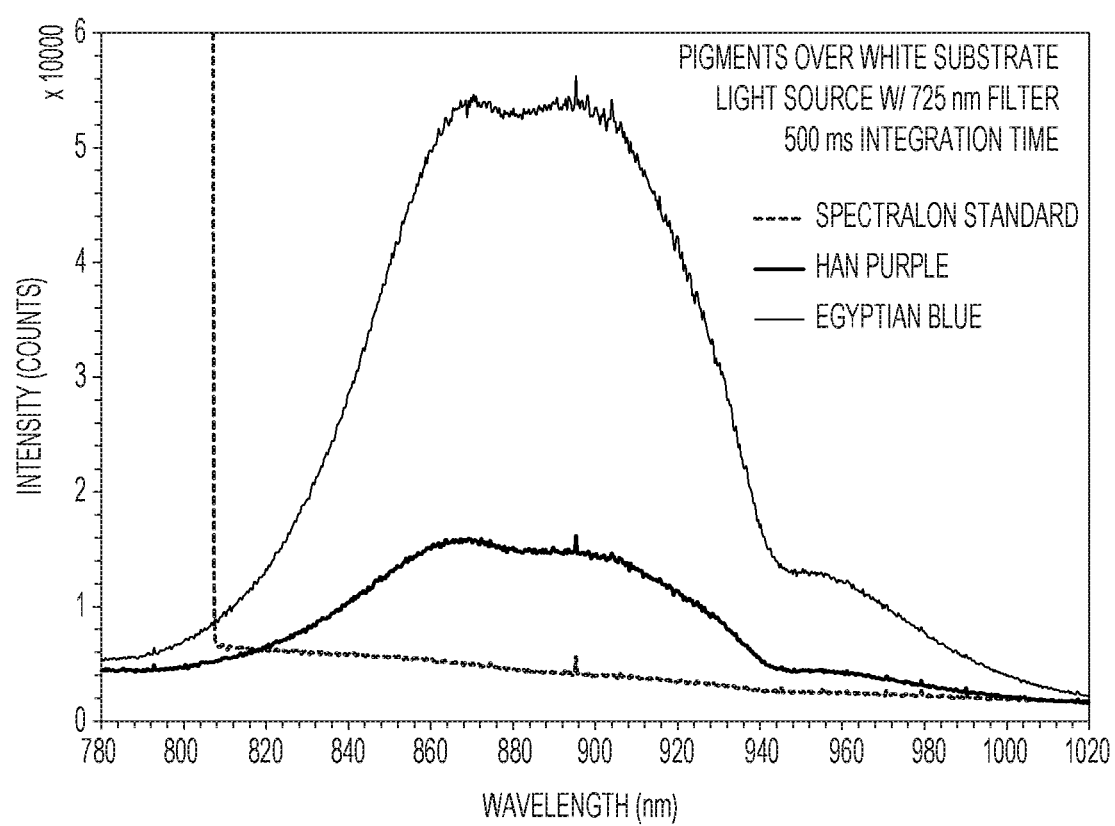
FIG. 8 is a graph of NIR fluorescence spectra for a) Egyptian blue and b) Han purple coatings over a white substrate.

Alkali earth copper silicate pigments including Egyptian blue ($CaCuSi_4O_{10}$), Han purple ($BaCuSi_2O_6$), $SrCuSi_4O_{10}$, as well as $BaCuSi_4O_{10}$ and $SrCuSi_4O_{10}$ with lithium and lanthanum as co-dopants, were evaluated for NIR fluorescent properties. Egyptian blue ($CaCuSi_4O_{10}$) emits from 900 to 1000 nm. Egyptian blue was incorporated into a coating formulation based on a PVDF film-forming resin at 0.14 and 0.4 pigment to binder (P:B) ratios. FIG. 7 shows the fluorescence spectra of (a) an Egyptian blue pigment (bold solid line), (b) a 0.14 P:B Egyptian blue coating over chrome primed aluminum substrate (light solid line) and (c) a 0.4 P:B Egyptian blue coating over chrome primed aluminum substrate (bold dashed line). The excitation wavelength for all samples was 600 nm. FIG. 8 shows the emission spectra of Egyptian blue and Han purple ($BaCuSi_2O_6$) coatings based on an acrylic paint over a white substrate.

Han blue ($BaCuSi_4O_{10}$) and the alkali earth metal ($SrCuSi_4O_{10}$) with lithium and lanthanum as co-dopants showed NIR fluorescent properties. Additionally, cadmium pigments, CdSe and CdTe reagents, a "zirconia" red (a red cadmium pigment coated with a zirconium silicate glass), indigo, blue verditer, copper blue, azurite ($Cu_3(CO_3)_2(OH)_2$), Ploss blue (($CuCa)(CH_3COO)_2 \cdot 2H_2O$), and smalt blue ($CoO.K.Si$) were prepared. These pigments did not show NIR fluorescence during testing, ruling out strong fluorescence but not weak fluorescence. In particular, cadmium pigments (alloys of CdS and CdSe with colors ranging from yellow, to orange, to red, and black) are direct gap semiconductors that do fluoresce (M. Thoury, et al. *Appl. Spectroscopy* 65, 939-951 (2011)), and nanoparticles of CdSe have exhibited quantum efficiencies as high as 0.8 (P. Reiss, et al., *Nano Letters* 2, 781-784 (2002)).

Example 5

Reflectance Measurements of Non-Fluorescent Pigments

Figure 9:
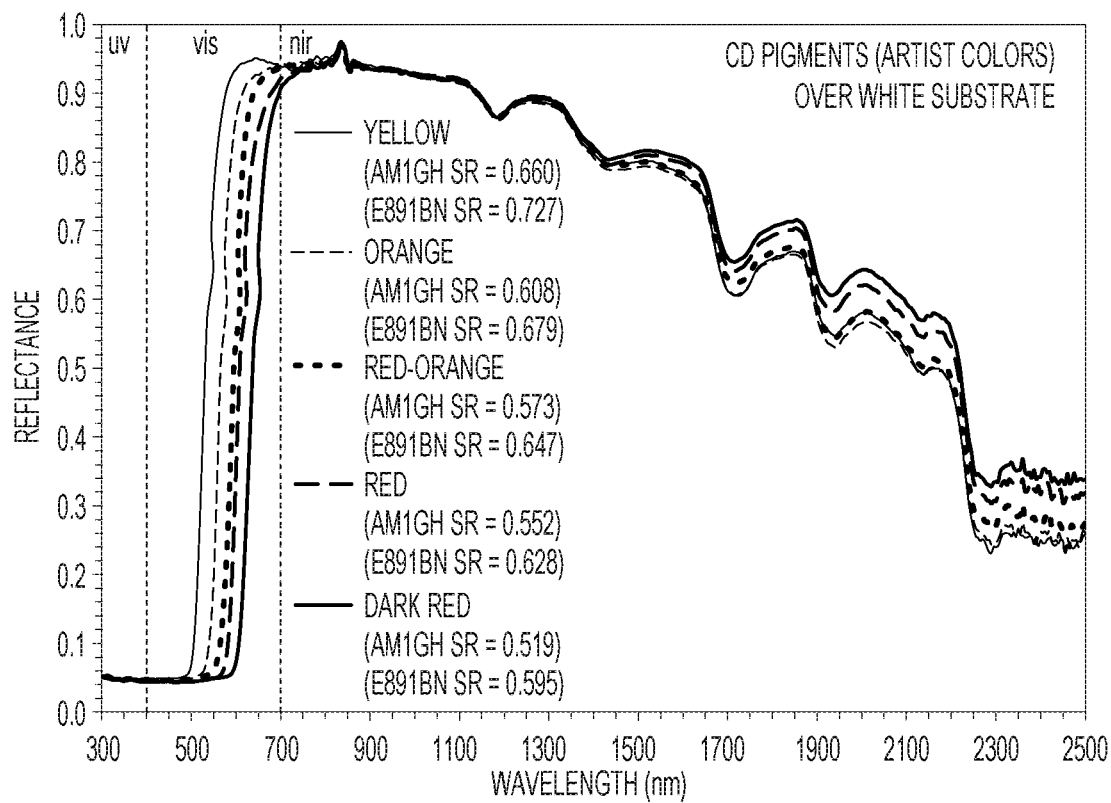
FIG. 9 is a graph showing reflectance of Cd pigments in acrylic-based artists paints over a white substrate.
Figure 10:
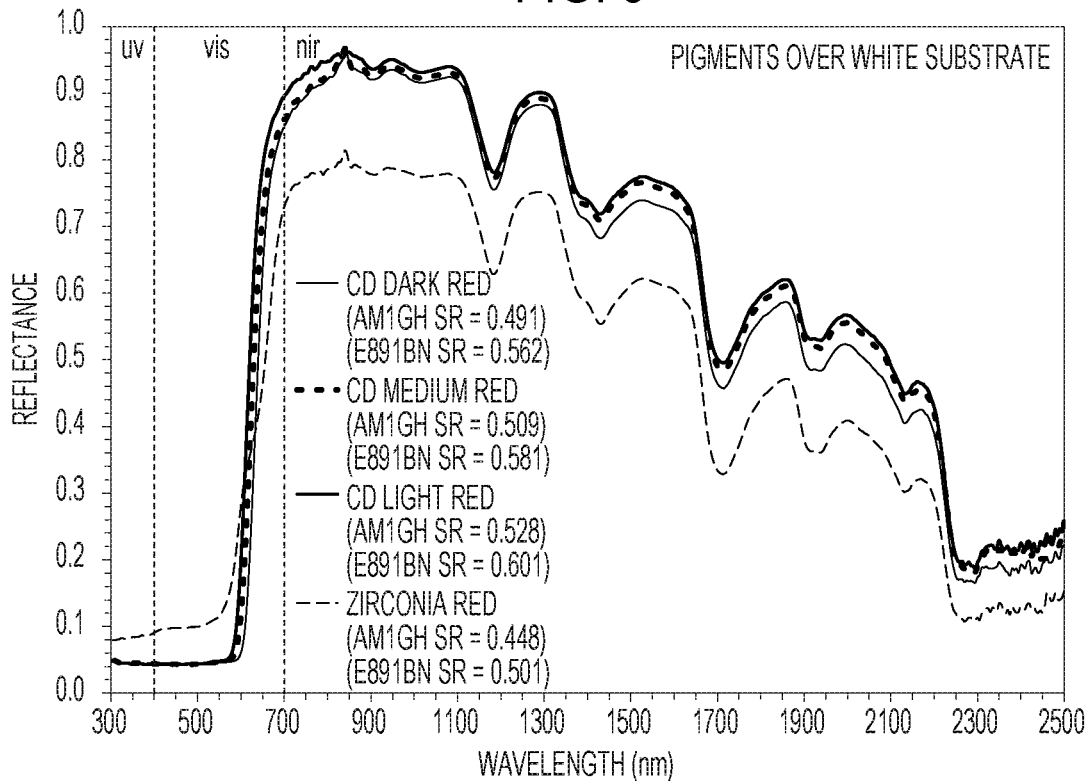
FIG. 10 shows a graph of reflectance of 3 cadmium pigments (dark red, medium red, and light red) and a zirconia red pigment.

FIG. 9 shows a graph of the reflectance of five cadmium pigments, commercially available as artist paints, of formula $CdS_{1-x}Se_x$ with x=0 for yellow to x almost equal to 1 for dark red. As FIG. 9 indicates, as x increases, the absorption edge shifts to a longer wavelength. FIG. 10 shows a graph of the reflectance of three cadmium pigments (dark red, medium red, and light red) and a zirconia red pigment, commercially available from Kremer Pigment Inc. (New York, N.Y.). These reflectance measurements indicate that, even without fluorescence, the cadmium pigments are "cool" (IR reflective), with a sharp transition from absorptive to reflective at their semiconducting band edges, shown in FIG. 9 and FIG. 10.

Solar reflectance was tested according to the air-mass 1 global horizontal (AM1GH) solar reflectance (SR) test using a standard solar reflectance spectrum that corresponds to a clear day with the sun overhead (R. Levinson, H. Akbari, and P. Berdahl, "Measuring solar reflectance—part I: defining a metric that accurately predicts solar heat gain," *Solar Energy* 84, 1717-1744 (2010)).

Figure 11:
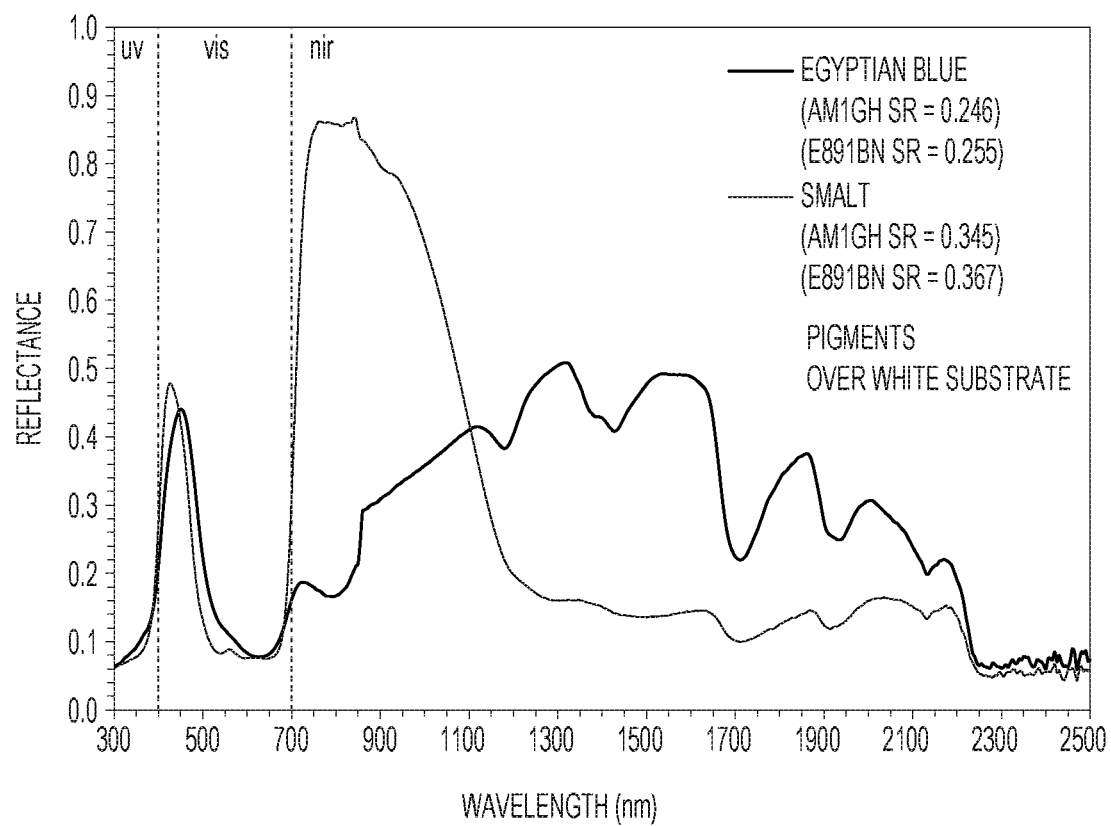
FIG. 11 shows a graph of spectral reflectance of smalt blue (CoO.K.Si) as compared to the spectral reflectance of Egyptian blue ($CaCuSi_4O_{10}$)

FIG. 11 shows a graph of the spectral reflectance of smalt blue ($CoO.K.Si$), a cobalt potassium silicate glass, as compared to the spectral reflectance of Egyptian blue ($CaCuSi_4O_{10}$). FIG. 11 shows a very sharp transition from absorptive to reflective right at 700 nm. The reflectance measurement with respect to Egyptian blue over a white substrate shows some absorption in the 700 to 1100 nm range.

Cadmium yellow, orange, and red pigments were measured for their fluorescence and they all demonstrated some level of NIR fluorescence. CdSe nanoparticles showed some fluorescence behavior, most notably at about 850-1300 nm for two cadmium pigments having a deep red color.

Example 6

Physical Characterization of $Cr_2O_3$ Doped $Al_2O_3$ Pigments

Two samples of $Cr_2O_3$ doped $Al_2O_3$ with different particle sizes and levels of chromium (1.5 wt % $Cr_2O_3$ and the other was 4.5 wt % $Cr_2O_3$) were analytically tested (microscopy, particle size, and elemental composition). The two pigments contained different levels of chromium as evidenced by the elemental data (x-ray fluorescence). The two pigments were evaluated for their NIR fluorescence behavior, which indicated that the 1.5 wt % $Cr_2O_3$ doped $Al_2O_3$ displayed a more intense fluorescence than the 4.5 wt % $Cr_2O_3$ doped $Al_2O_3$.

FIG. 2 shows scanning electron micrographs of the 1% $Cr_2O_3$ doped $Al_2O_3$ pigment (Micrograph A) and the 3% $Cr_2O_3$ doped $Al_2O_3$ (Micrograph B). The particle size for the 3% $Cr_2O_3$ doped $Al_2O_3$ pigment was much smaller (650 nm) than the 1% $Cr_2O_3$ doped $Al_2O_3$ (several microns).

Example 7

Spectroscopy Data for Alkali Earth Copper Silicate Pigments in Different Types of Coatings Table 2 lists alkali earth copper silicate pigments that were tested for NIR fluorescence.

TABLE 2

| Alkali earth copper silicate pigments | |
| --- | --- |
| Chemical formula | Common name |
| $BaCuSi_2O_6$ | Han purple |
| $CaCuSi_4O_{10}$ | Egyptian blue |
| $SrCuSi_4O_{10}$ | — |
| $BaCuSi_4O_{10}$ | Han blue |
| $Sr(La,Li)CuSi_4O_{10}$ | — |
| $Ba(La,Li)CuSi_4O_{10}$ | — |

Figure 12:
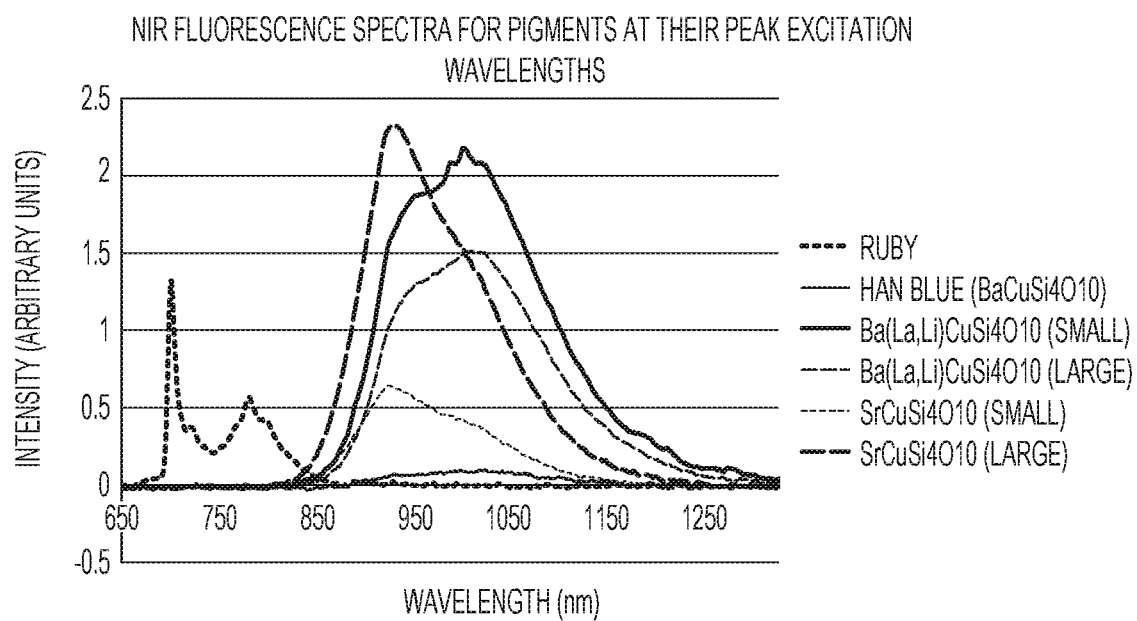
FIG. 12 shows NIR fluorescence spectra of several alkali earth copper silicates.

FIG. 12 shows the NIR fluorescence spectra of several alkali earth copper silicate pigments (excitation wavelength of 600 nm). Ruby (1.5 wt % $Cr_2O_3$ doped $Al_2O_3$) was included for comparison (excitation wavelength of 550 nm). $Ba(La,Li)CuSi_4O_{10}$ and $Sr(La,Li)CuSi_4O_{10}$ NIR fluorescence spectra were measured for small and large particle sizes.

Four coatings based on two pigments $Ba(La,Li)CuSi_4O_{10}$ (small particles) and $SrCuSi_4O_{10}$ (large particles) in two film-forming resins (one containing PVDF and the other being acrylic-based) were evaluated. Table 3 shows the solar reflectance (AM1GH and ESR), benefit from fluorescence, reflectance, and substrate of these four coatings in a film-forming resin containing PVDF over a yellow substrate and a white substrate. Benefit from fluorescence is the difference between AM1GH and ESR solar reflectance, indicating the contribution of fluorescence to the solar reflectance. Table 4 shows the solar reflectance (AM1GH and ESR), benefit from fluorescence, reflectance, and substrate of these four coatings in an acrylic film-forming resin over a white substrate.

and after washing the color is blue. FIG. 16H shows the fluorescence of some Egyptian blue samples. 16I shows the reflectance data corresponding to FIG. 16H.

TABLE 3

Spectroscopy data for Ba(La,Li)CuSi$_4$O$_{10}$ (small particles) and SrCuSi$_4$O$_{10}$ (large particles) in a film-forming resin containing PVDF

| Pigment in PVDF coating | Solar reflectance (AM1GH)[1] | Solar reflectance (ESR)[2] | Benefit from fluorescence | Reflectance (550 nm)[3] | Substrate |
|---|---|---|---|---|---|
| Ba(La,Li)CuSi$_4$O$_{10}$ (small particles) | 0.442 | 0.447 | 0.005 | 0.365 | Yellow[4] |
| Ba(La,Li)CuSi$_4$O$_{10}$ (small particles) | 0.573 | 0.621 | 0.048 | 0.485 | White[5] |
| SrCuSi$_4$O$_{10}$ (large particles) | 0.434 | 0.446 | 0.012 | 0.349 | Yellow[4] |
| SrCuSi$_4$O$_{10}$ (large particles) | 0.605 | 0.649 | 0.044 | 0.510 | White[5] |

[1] AM1GH refers to the solar spectrum used to tabulate the solar reflectance from the spectrometer data.
[2] The ESR (Effective Solar Reflectance) is obtained from temperature measurements in sunlight.
[3] The reflectance at 550 nm is a measure of visual brightness.
[4] Yellow chrome primer over aluminum substrate. Appearance is green with a blue overcoat.
[5] White primer over yellow chrome primed aluminum substrate.

TABLE 4

Spectroscopy data for Ba(La,Li)CuSi$_4$O$_{10}$ (small particles) and SrCuSi$_4$O$_{10}$ (large particles) in an acrylic film-forming resin containing

| Pigment in acrylic-based coating | Solar reflectance (AM1GH)[1] | Solar reflectance (ESR)[2] | Benefit from fluorescence | Reflectance (550 nm)[3] | Substrate | Pigment amount (g/m2)[4] |
|---|---|---|---|---|---|---|
| Ba(La,Li)CuSi$_4$O$_{10}$ (small particles) | 0.361 | 0.436 | 0.075 | 0.192 | Bright white | 160 |
| SrCuSi$_4$O$_{10}$ (large particles) | 0.405 | 0.498 | 0.093 | 0.173 | Bright white | 100 |

[1] AM1GH refers to the solar spectrum used to tabulate the solar reflectance from the spectrometer data.
[2] The ESR (Effective Solar Reflectance) is obtained from temperature measurements in sunlight.
[3] The reflectance at 550 nm is a measure of visual brightness.
[4] Amount of pigment per unit area.

Figure 13:
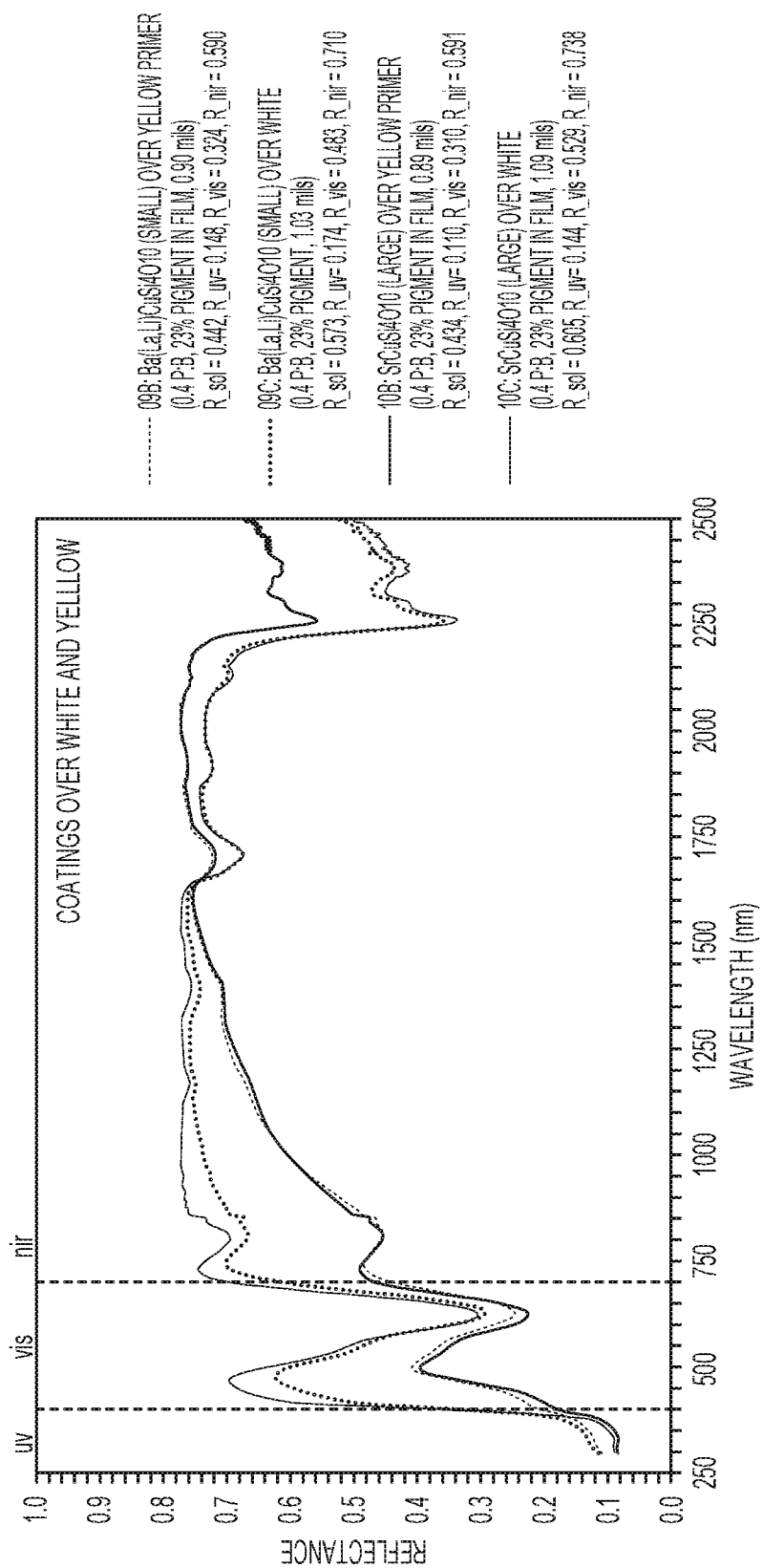
FIG. 13 shows plots of spectral reflectance for PVDF-type coatings containing $Ba(La,Li)CuSi_4O_{10}$ (small particles) and $SrCuSi_4O_{10}$ (large particles) over white and yellow substrates.
Figure 14:
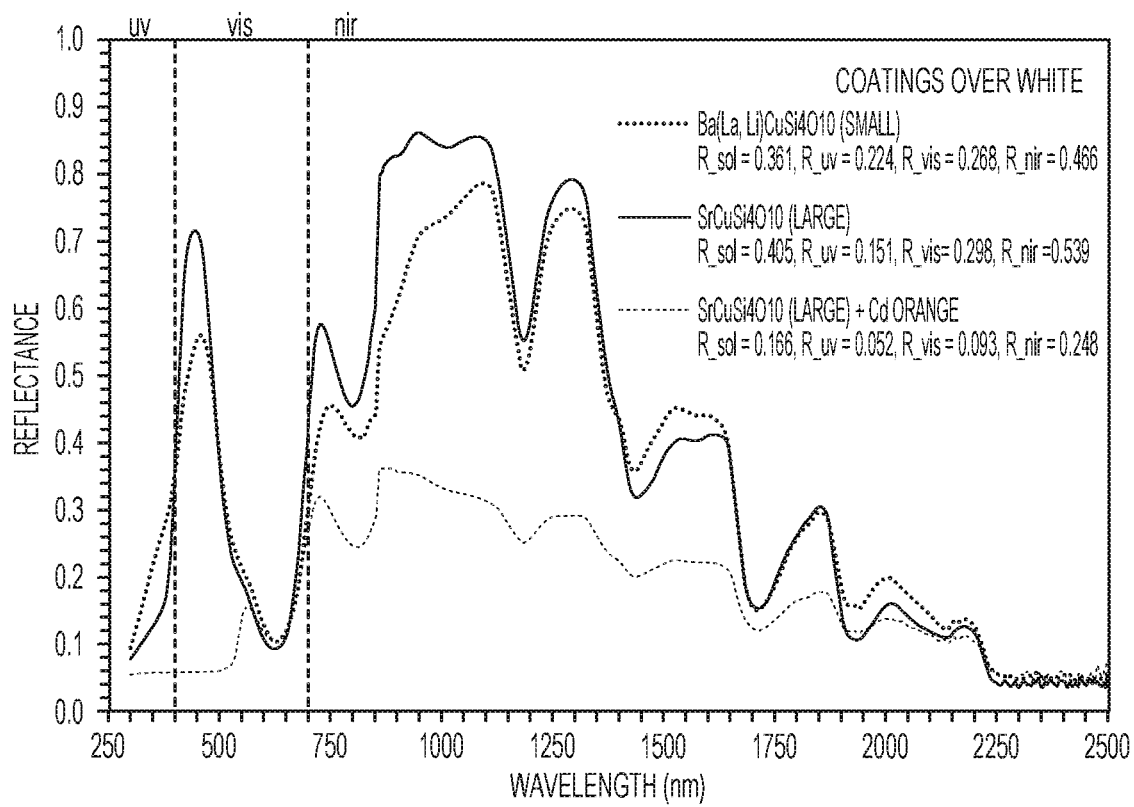
FIG. 14 shows plots of spectral reflectance for acrylic-type coatings containing $Ba(La,Li)CuSi_4O_{10}$ (small particles) and $SrCuSi_4O_{10}$ (large particles) over white and yellow substrates.
Figure 15:
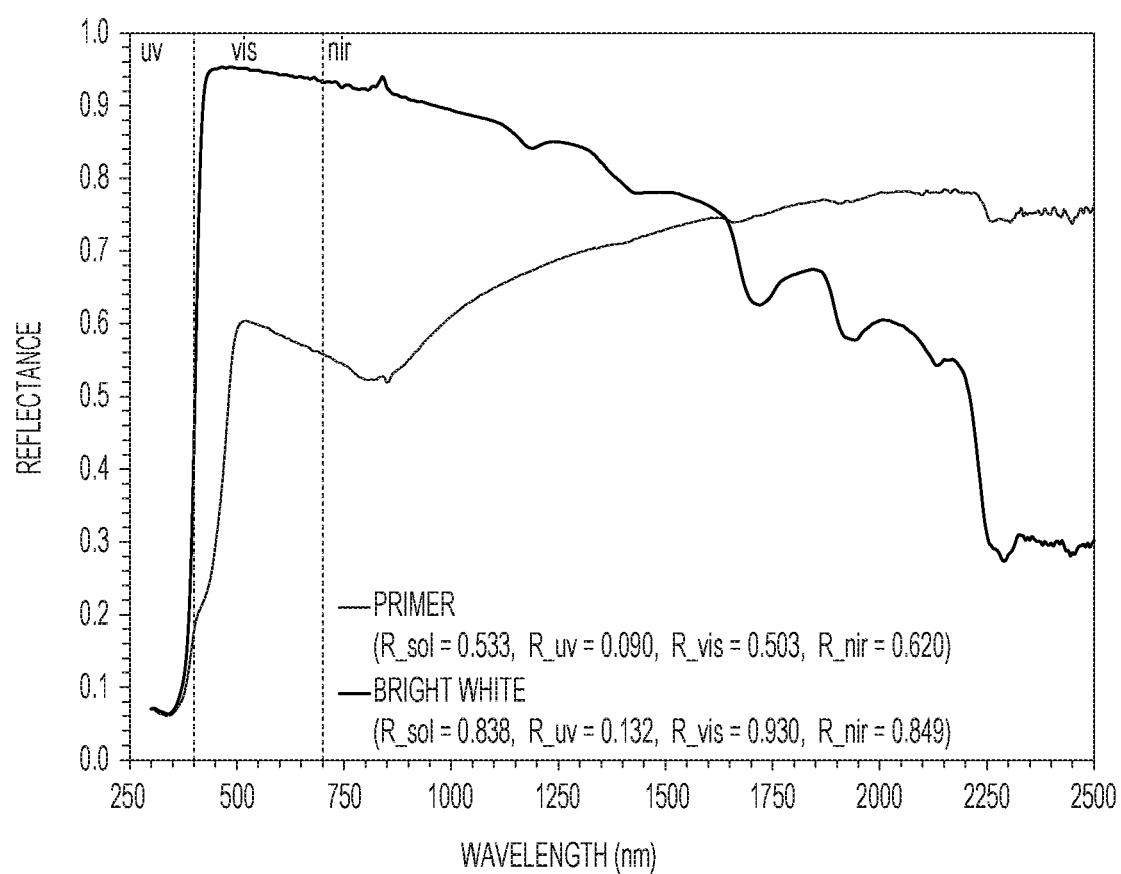
FIG. 15 shows reflectance of the yellow primer and the white-coated substrates used in the coatings of FIGS. 14 and 15.

FIG. 13 shows the plots of spectral reflectance for PVDF-type coatings containing Ba(La,Li)CuSi$_4$O$_{10}$ (small particles) and SrCuSi$_4$O$_{10}$ (large particles) over white and yellow substrates. FIG. 14 shows the plots of spectral reflectance for acrylic-based coatings containing Ba(La,Li)CuSi$_4$O$_{10}$ (small particles) and SrCuSi$_4$O$_{10}$ (large particles) over white substrates. FIG. 15 shows the reflectance of the yellow primer and the white-coated substrates used in the coatings of FIGS. 13 and 14.

Figure 16A:
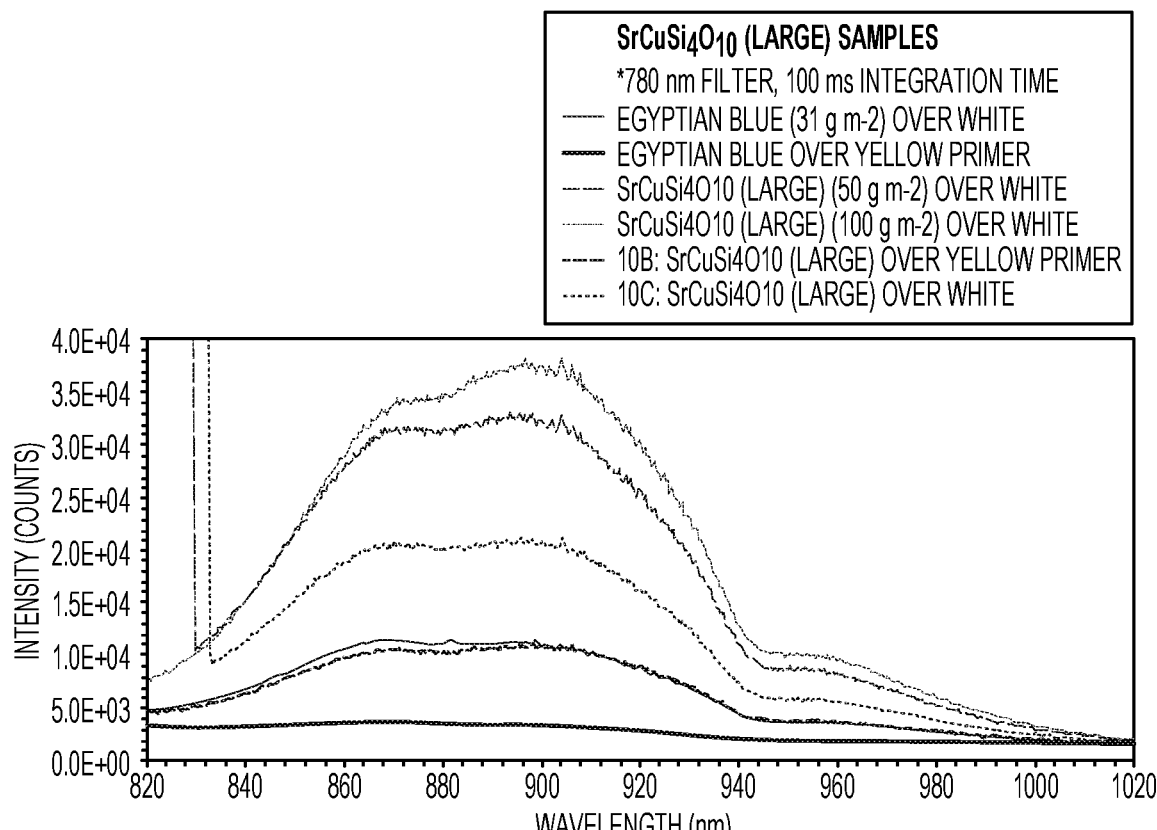
FIG. 16A shows fluorescence from several samples made with $SrCuSi_4O_{10}$ (large particle size)
Figure 16B:
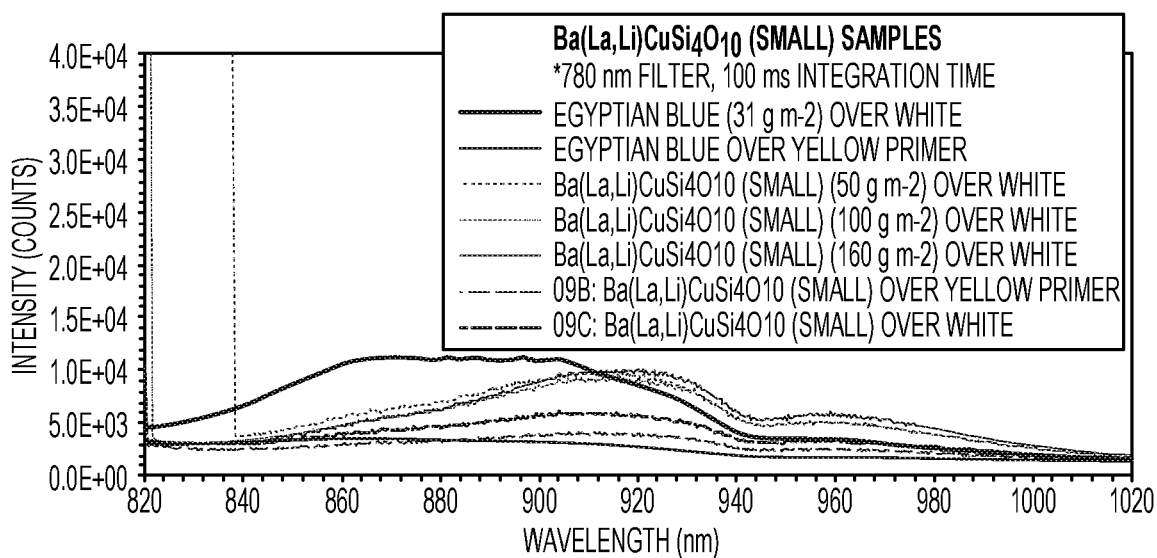
FIG. 16B shows plots similar to those of FIG. 16A, but utilizing the $Ba(La,Li)CuSi_4O_{10}$ (small particle size)
Figure 16C:
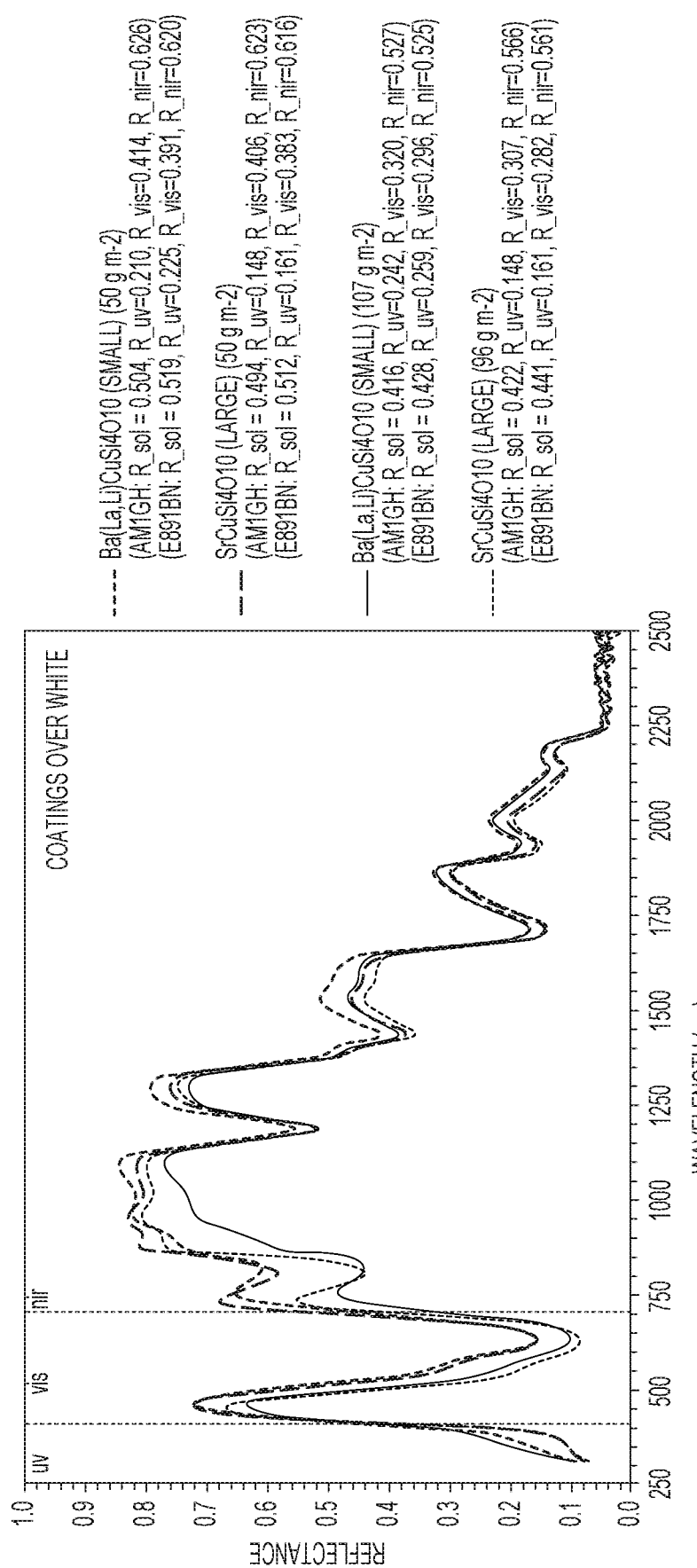
FIG. 16C shows reflectance data that corresponds to FIGS. 16A and 16B.
Figure 16D:
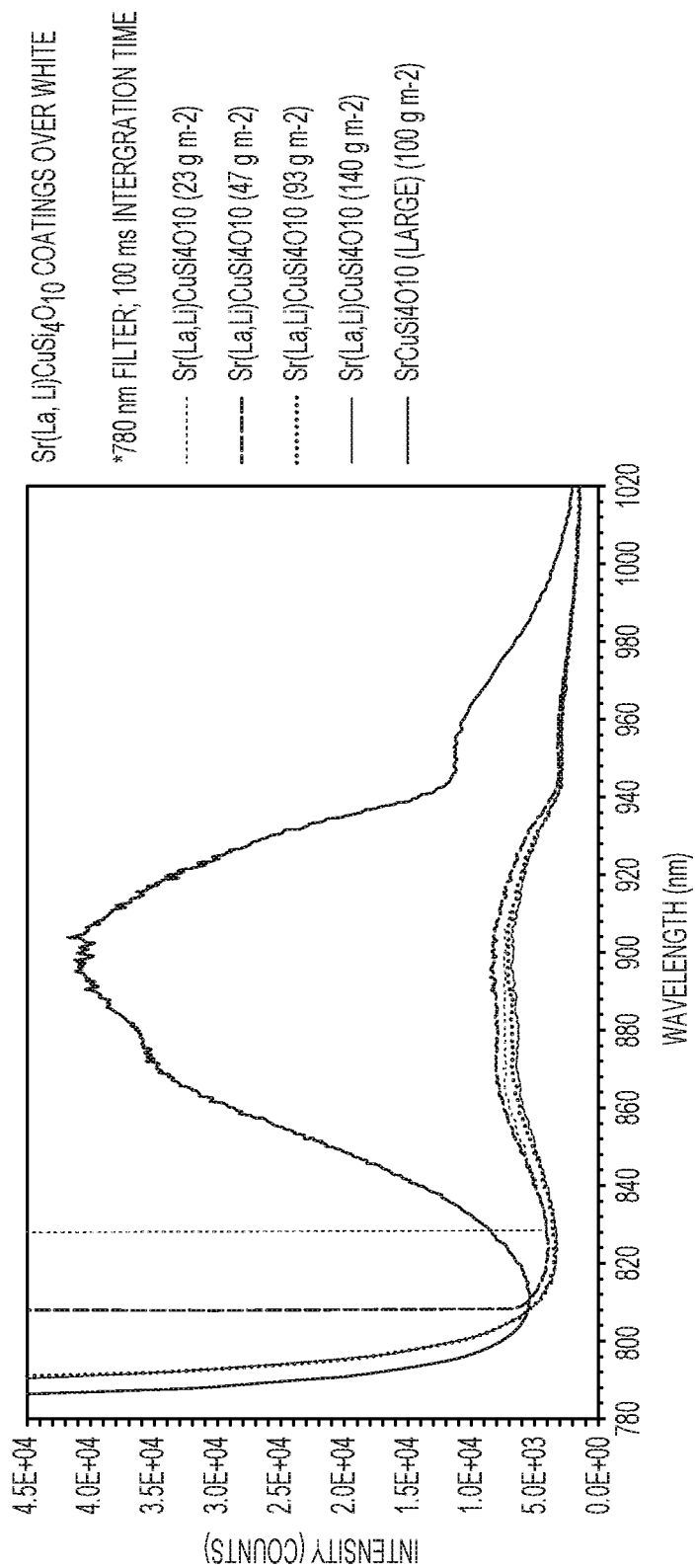
FIG. 16D shows fluorescence of a strontium compound doped with equal amounts of La and Li, compared with an undoped material.
Figure 16E:
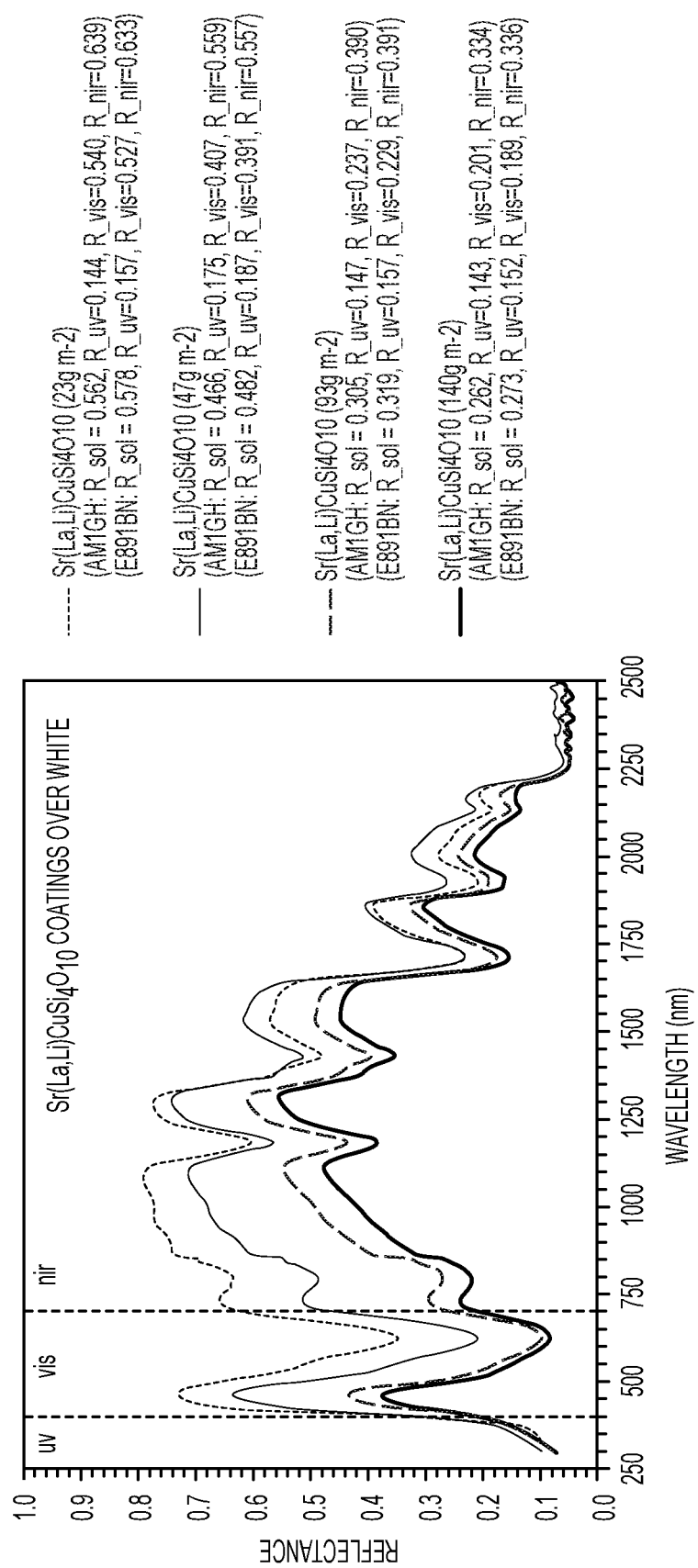
FIG. 16E shows reflectance data corresponding to FIG. 16D.
Figure 16F:
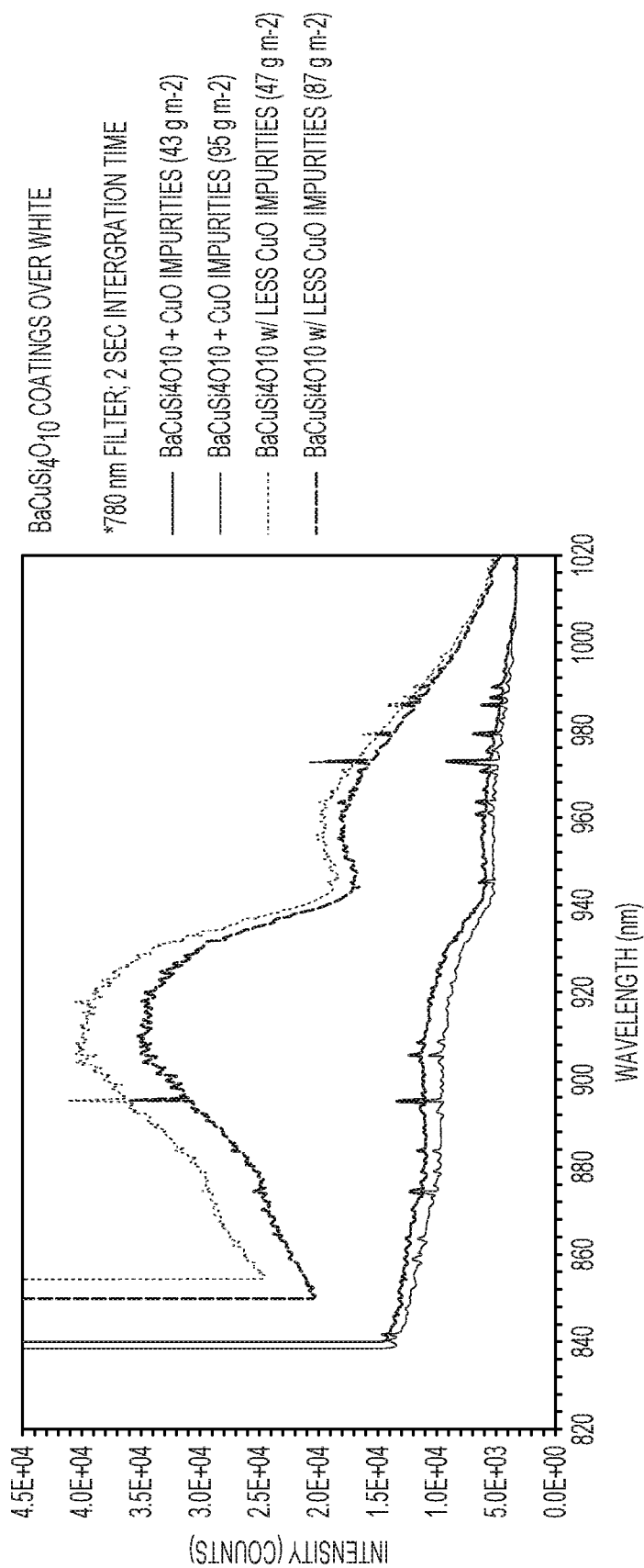
FIG. 16F shows fluorescence data on a $BaCuSi_4O_{10}$ sample that is contaminated with CuO.
Figure 16G:
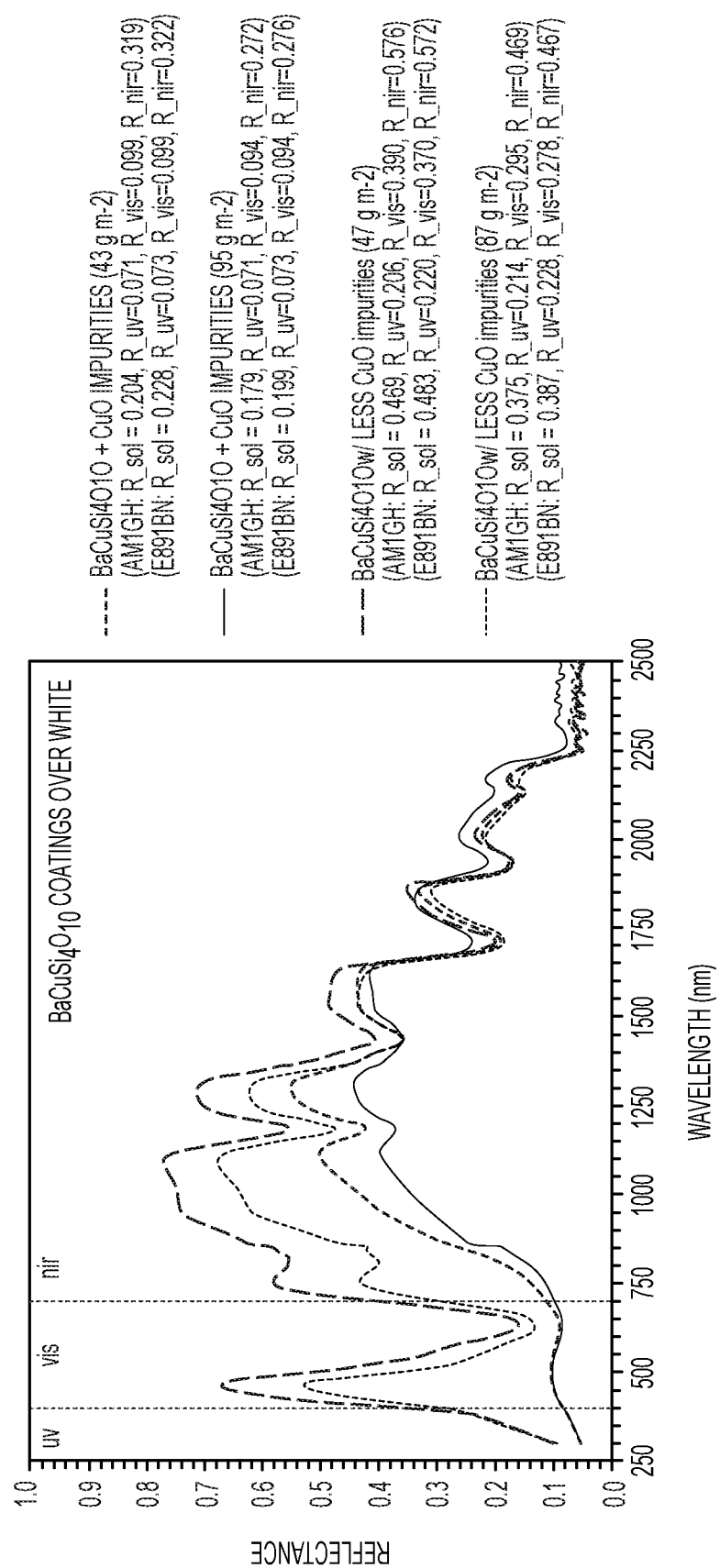
FIG. 16G shows reflectance data corresponding to the prior fluorescence plot.
Figure 16H:
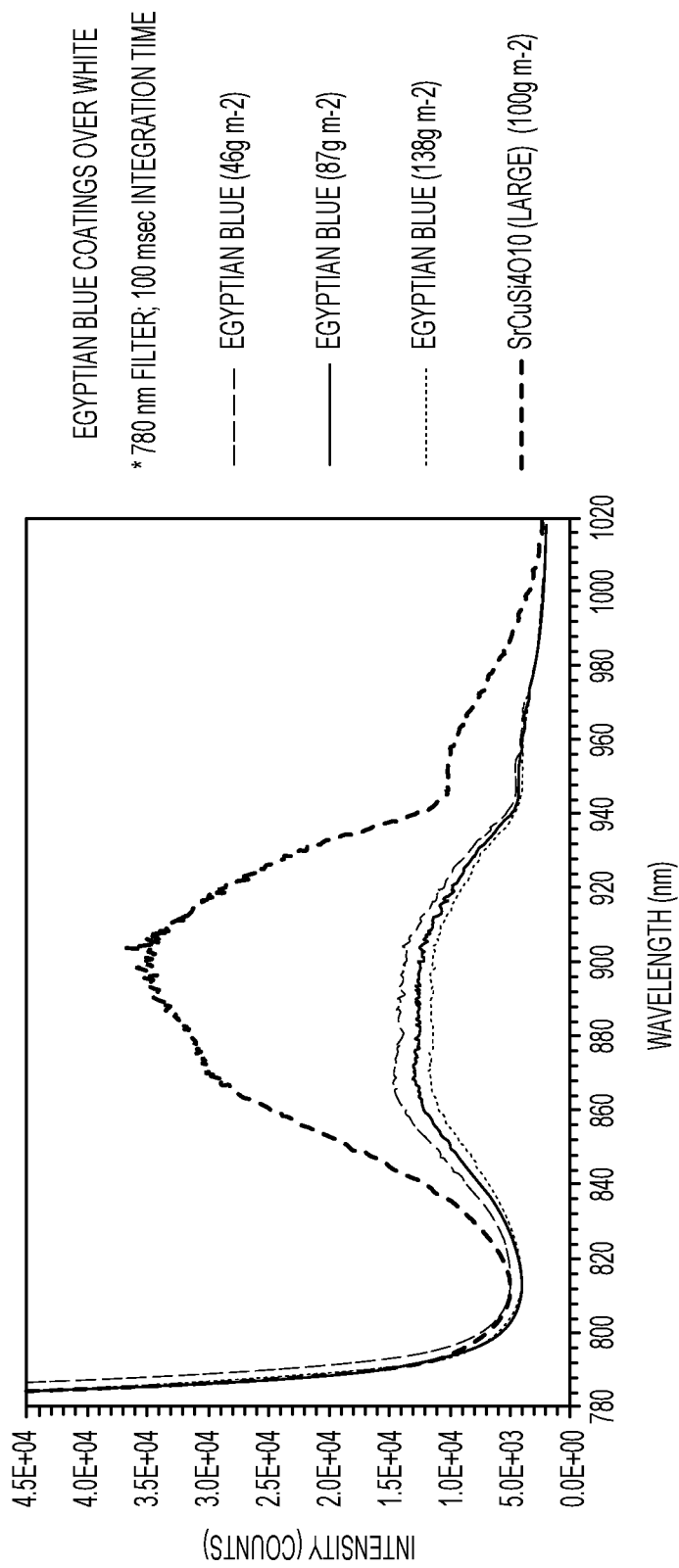
FIG. 16H shows fluorescence of Egyptian blue samples.
Figure 16I:
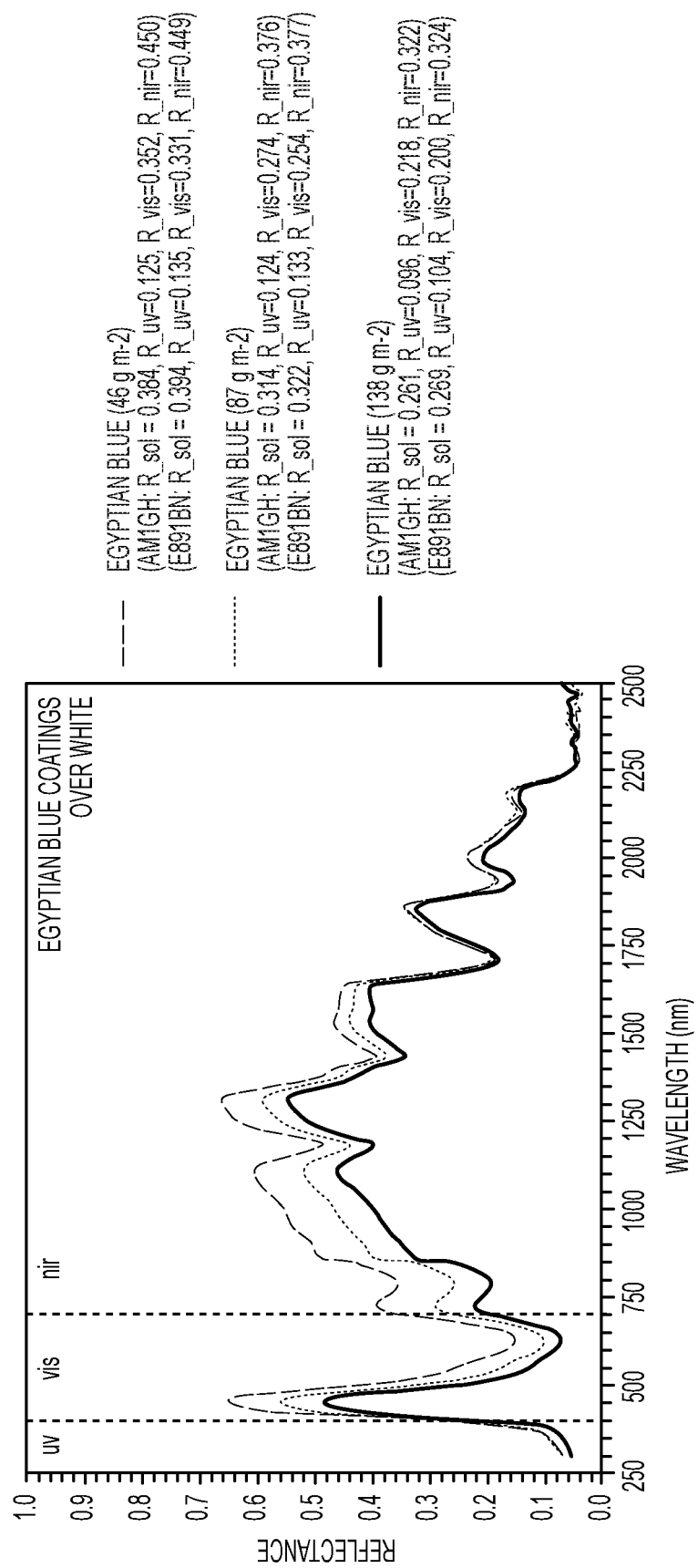
FIG. 16I shows reflectance data corresponding to FIG. 16H.

FIG. 16A shows the fluorescence from several samples including SrCuSi$_4$O$_{10}$ (large particle size) as compared to Egyptian blue. The two top curves (SrCuSi$_4$O$_{10}$ (Large) (100 g/m$^2$) over white and SrCuSi$_4$O$_{10}$ (Large) (50 g/m$^2$) over white) show that increased pigment amount yields more fluorescence. FIG. 16B shows the fluorescence for samples including Ba(La,Li)CuSi$_4$O$_{10}$ (small). FIG. 16C shows the reflectance data that corresponds to FIGS. 16A and 16B. FIG. 16D shows the fluorescence of a strontium compound doped with equal amounts of La and Li, compared with an undoped material. FIG. 16E shows the reflectance data corresponding to FIG. 16D. FIG. 16F shows the fluorescence data on a BaCuSi$_4$O$_{10}$ sample that is contaminated with CuO. FIG. 16G shows the reflectance data corresponding to the fluorescence plot of FIG. 16F. The spectra in the visible region show that before washing, the color is gray, Example 8

Ratios of Pigment to Film-Forming Resin and Film Thickness

Figure 17:
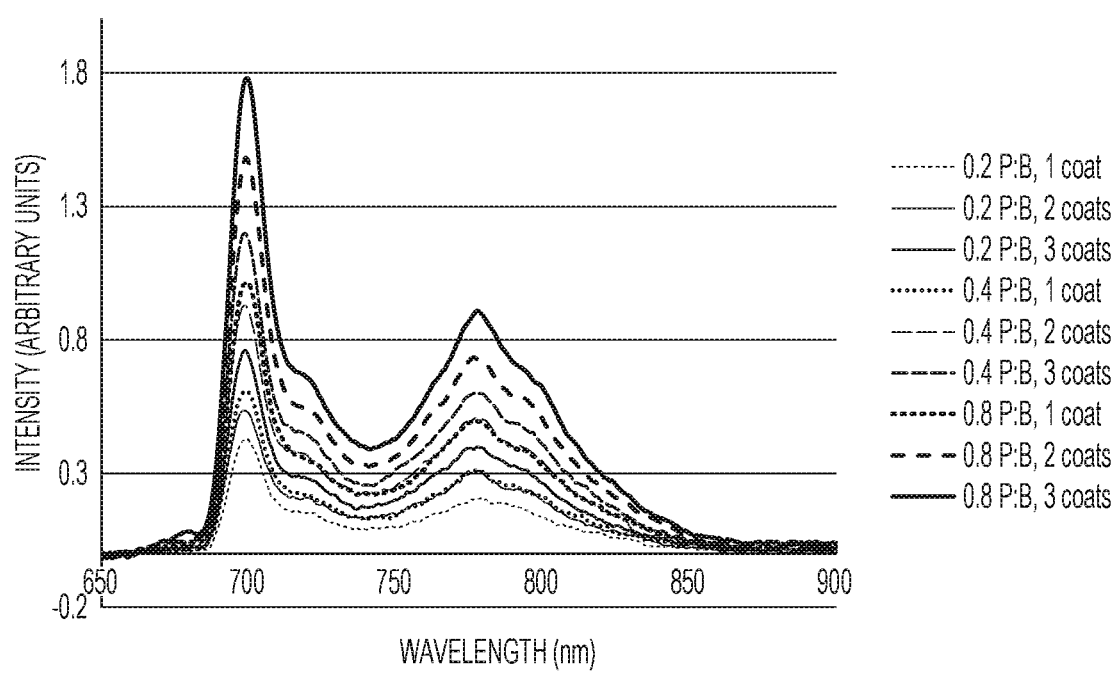
FIG. 17 shows nine NIR fluorescence spectra corresponding to coatings containing 1.5 wt % $Cr_2O_3$ doped $Al_2O_3$ in PVDF-based coatings at three P:B ratios (0.2, 0.4, and 0.8) and three film thicknesses (1 coat, 2 coats, 3 coats) per P:B ratio.

The effect of pigment loading level and the effect of film thickness (at a given pigment to binder (P:B) ratio) on fluorescence intensity were evaluated. A pigment to binder ladder ranging from 0.2 P:B to 0.8 P:B and film thickness ladders for each P:B ratio ranging from one to three coats were coated over an aluminum substrate coated with a yellow chrome primer and a white primer. 3% Cr$_2$O$_3$ doped Al$_2$O$_3$ pigment (small particles 650 nm) was incorporated into a PVDF-based coating system during the dispersion phase of paint making. The color of the coatings was pink. Test coatings were prepared over yellow chrome primed substrates. FIG. 17 shows nine fluorescence spectra corresponding to coatings with three P:B ratios (0.2, 0.4, and 0.8) and three film thicknesses (1 coat, 2 coats, 3 coats) for each coating. The intensity of the fluorescence increases with increasing P:B ratio and film thickness.

Figure 18:
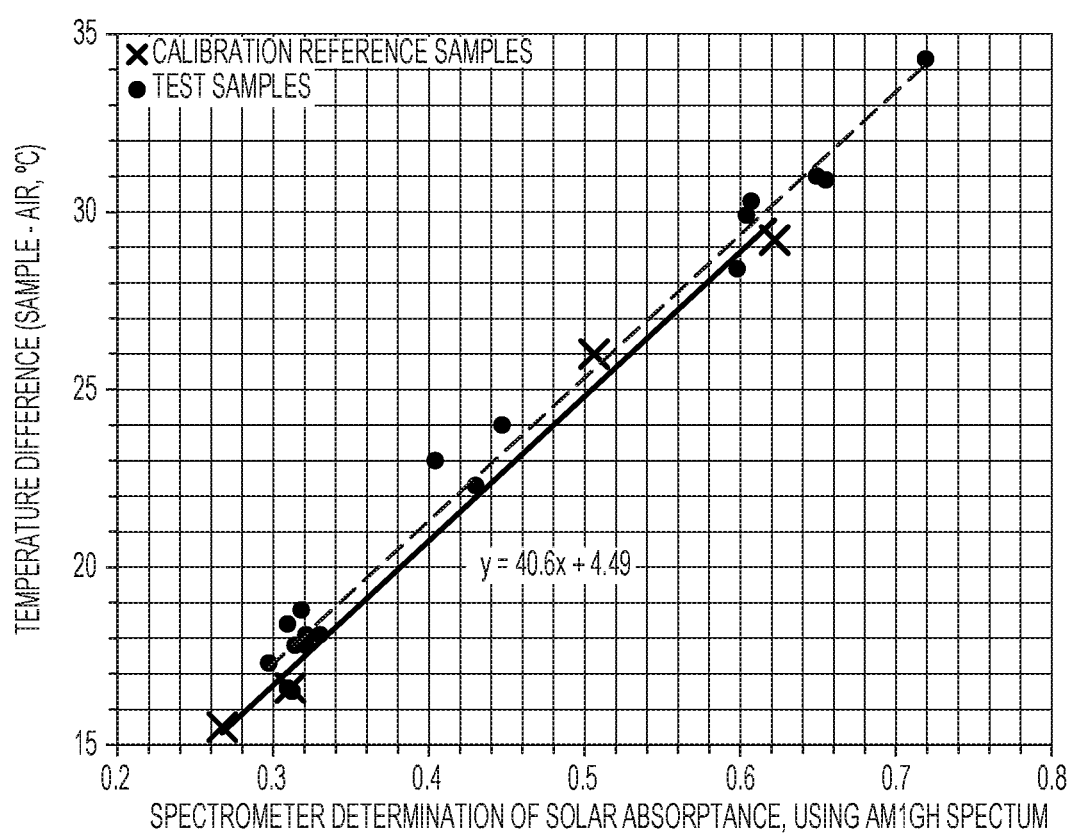
FIG. 18 shows temperature measurements for 18 test samples and 4 calibrated reference samples.

These coatings and additional coatings (3% Cr$_2$O$_3$ doped Al$_2$O$_3$ coatings over yellow primer, Egyptian blue, Han blue and Han purple) were also evaluated for ESR measurements in the sun. ESR may also be expressed in terms of the effective solar absorptance, α according to the following equation α=1–ESR. FIG. 18 shows the temperature measurements for 18 samples (1.5% $Cr_2O_3$ doped $Al_2O_3$ pigment with P:B ratios of 0.2, 0.4, and 0.8 and 1, 2, and 3 coats film thickness, 1.5% $Cr_2O_3$ doped $Al_2O_3$ coatings over yellow primer, Egyptian blue pigment with P:B ratios of 0.4 and 0.8; Han blue pigment with P:B ratios of 0.4 and 0.8; Han purple pigment with P:B ratios of 0.4 and 0.8), and also for 4 gray-scale standards. The resulting values are plotted versus the α-values from spectrometer spectral reflectance measurements. Linear least square fit lines are given for the calibration samples (bold line), and for the tested samples. The two lines are parallel, but are shifted from one another by about 0.5° C. FIG. 18 shows the temperature differences above the ambient temperature for these 18 samples and the 4 calibrated standards. The ESR values are obtained by using the sample temperatures to determine the solar absorption the calibration samples would require to come to the same temperature. From the cluster of coolest samples, the difference in temperatures is about 2.5° C., which may be due to the α-values of the samples and/or due to fluorescence. It is estimated that about 0.8° C. is due to α-values, and 1.7° C. is due to fluorescence. Using the slope of the curve, a contribution of roughly 0.04 to the α (and ESR) comes from fluorescence.

To assign temperature-based ESR values to the samples (Table 5), the bold calibration line and the observed temperatures were used. In earlier measurements of effective absorptance α, values on the order of 0.2 were measured. Then, an accuracy of 0.01-0.02 was achieved, about 5 to 10% of the value. In the current measurements with larger values of α, errors as large as about 0.04 may be present.

The data in FIG. 18 cluster into three groups. The lowest temperature group is associated with the ruby pigmented coatings over a white primer. The three samples near 23° C. temperature rise were ruby pigmented over a yellow primer, and the warmest group contained the coatings with copper silicate pigments (Egyptian blue, Han blue, and Han purple) over a yellow primer. Within the lowest temperature group, there is a correlation of temperature with fluorescence intensity. For example, the two lowest data points at 16.5° C. and 16.6° C. both exhibited bright fluorescence (Table 5).

TABLE 5

Solar reflectance (SR) and Effective Solar Reflectance (ESR) data for NIR fluorescent pigments PVDF-based coatings (Reflectance at 550 nm, measured with filter to exclude fluorescence)

| Pigment | P:B ratio | Film Thickness (mils) | SR from spectrometer (corrected to omit ruby fluorescence) | ESR from temp. meas. | Temp, rise in the sun, relative to air temp. (K) | Fluorescence brightness, peak height | Visual brightness |
|---|---|---|---|---|---|---|---|
| ruby | 0.2 | 0.94 | 0.682 | 0.648 | 18.8 | 11 | 0.703 |
| ruby | 0.2 | 2.71 | 0.679 | 0.672 | 17.8 | 22 | 0.658 |
| ruby | 0.2 | 3.05 | 0.67 | 0.665 | 18.1 | 27 | 0.624 |
| ruby | 0.4 | 0.87 | 0.686 | 0.672 | 17.8 | 20 | 0.664 |
| ruby | 0.4 | 2.65 | 0.691 | 0.702 | 16.6 | 37 | 0.603 |
| ruby | 0.4 | 3.03 | 0.679 | 0.665 | 18.1 | 36 | 0.583 |
| ruby | 0.8 | 0.78 | 0.691 | 0.658 | 18.4 | 27 | 0.636 |
| ruby | 0.8 | 1.76 | 0.703 | 0.685 | 17.3 | 41 | 0.573 |
| ruby | 0.8 | 2.49 | 0.688 | 0.704 | 16.5 | 39 | 0.542 |
| Egyptian blue | 0.4 | 0.73 | 0.396 | 0.375 | 29.9 | 0.22 | 0.353 |
| Egyptian blue | 0.8 | 0.81 | 0.402 | 0.412 | 28.4 | 0.22 | 0.363 |
| Han blue | 0.4 | 0.81 | 0.345 | 0.35 | 30.9 | 0.12 | 0.212 |
| Han blue | 0.8 | 0.89 | 0.281 | 0.266 | 34.3 | 0.12 | 0.116 |
| Han purple | 0.4 | N/A | 0.393 | 0.365 | 30.3 | 0.11 | 0.201 |
| Han purple | 0.8 | 0.89 | 0.351 | 0.348 | 31 | 0.11 | 0.124 |

Table 6 shows the temperature rise measurements using calibrated gray samples.

TABLE 6

Temperature rise measurements using calibrated gray samples

| Spectrometer absorptance (1-SR) | Temperature rise in the sun (K) |
|---|---|
| 0.267 | 15.5 + −0.5 |
| 0.311 | 16.6 + −0.3 |
| 0.506 | 26.0 + −0.6 |
| 0.622 | 29.2 + −0.6 |

Figure 19:
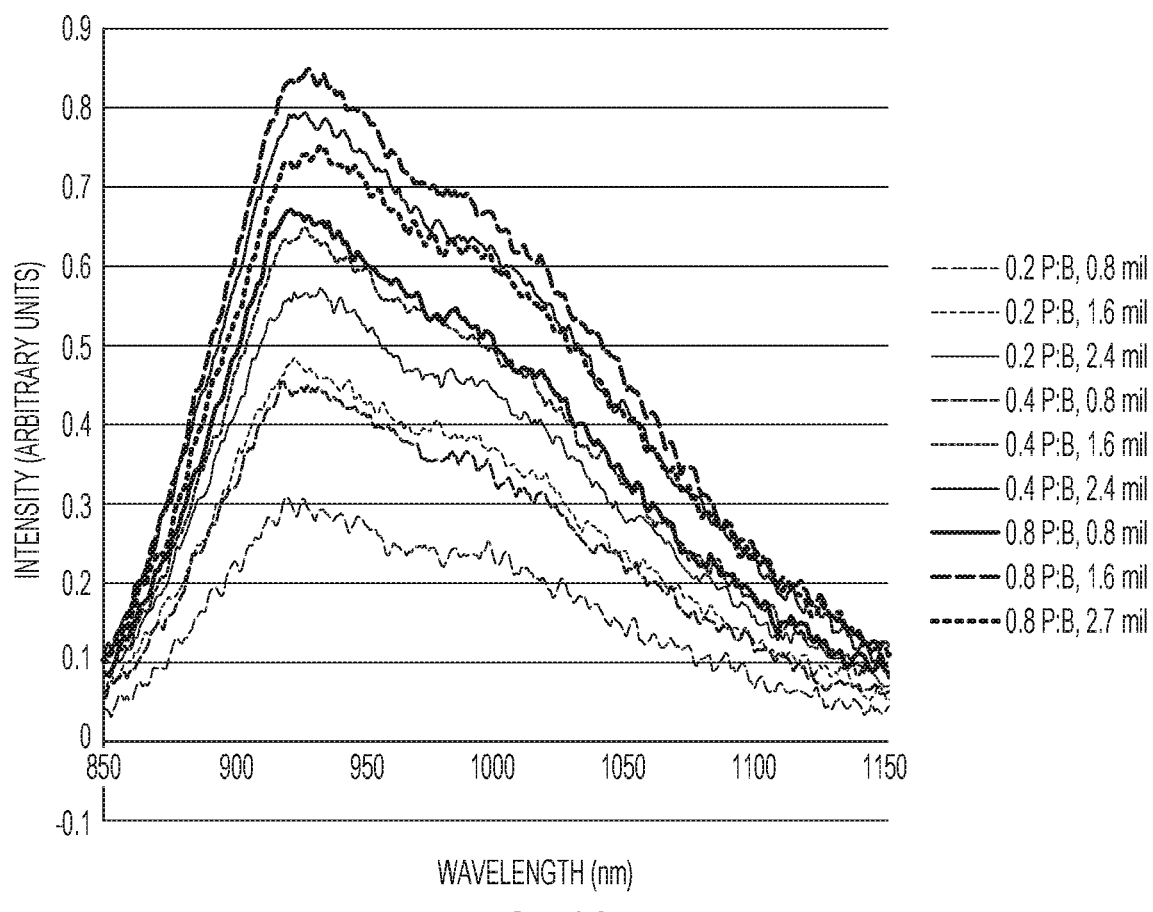
FIG. 19 shows NIR fluorescence spectra for PVDF-based coatings containing $Sr(La,Li)CuSi_4O_{10}$ at P:B ratios of 0.2, 0.4 and 0.8 applied over aluminum substrates coated with a yellow chrome primer and white primer with film thicknesses for each P:B coating of 0.8 mils, 1.6 mils and 2.4 mils.

Similar to the P:B ladder and film thickness study conducted with the ruby pigment, a P:B ladder and film thickness study was conducted with an alkali earth copper silicate pigment (Sr (La,Li)$CuSi_4O_{10}$). This pigment was incorporated into a PVDF-based coating system at P:B ratios of 0.2, 0.4 and 0.8 and these coatings were applied over aluminum substrates coated with a yellow chrome primer and white primer. Three film thicknesses were applied for each P:B coating, namely 0.8 mils, 1.6 mils and 2.4 mils. FIG. 19 shows the NIR fluorescence intensity increased with increasing P:B ratio (i.e. increased pigment loading). In addition, NIR fluorescence intensity increased with increasing film thickness for the 0.2 and 0.4 P:B coatings. For the 0.8 P:B coating, the 1.6 mil thick film demonstrated more intense fluorescence than the 2.7 mil thick film.

Figure 20:
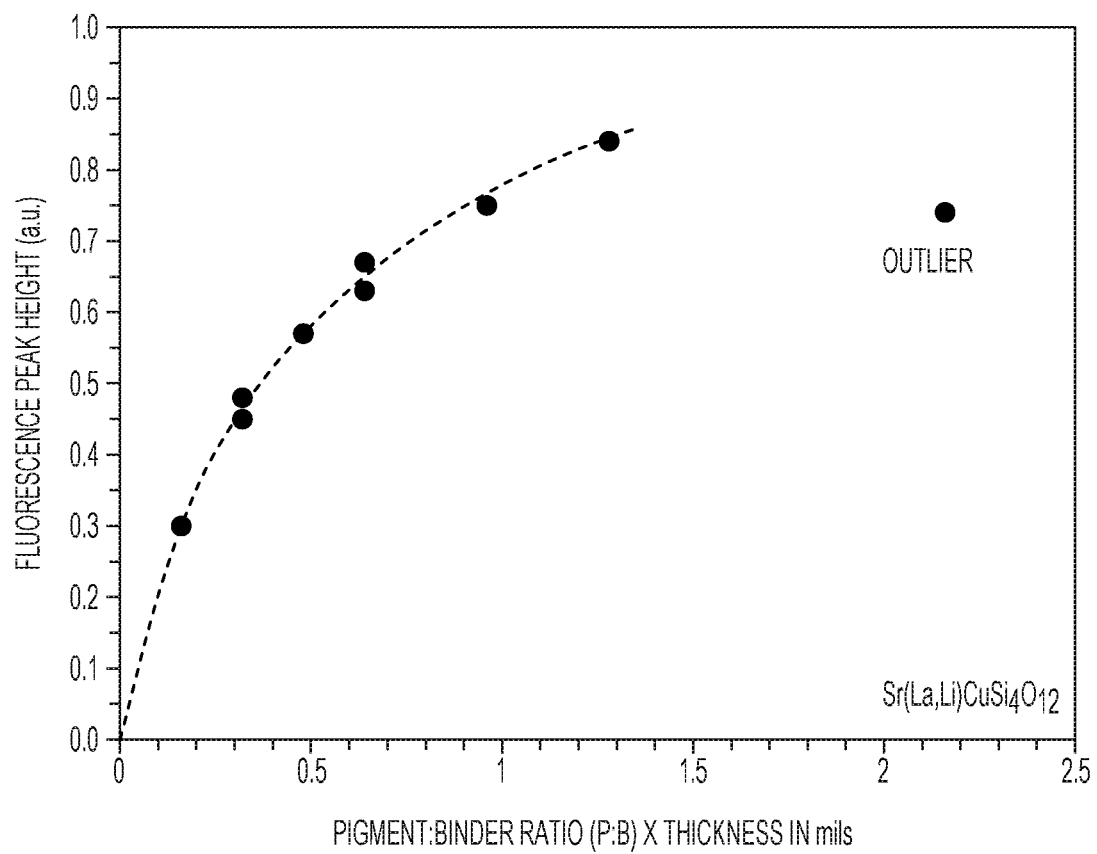
FIG. 20 shows peak heights of the coatings of FIG. 19 as a function of the product of P:B ratio and coating thickness.

FIG. 20 shows the peak heights of the fluorescence of the coatings of FIG. 19 as a function of the product of P:B ratio and coating thickness, that is, of pigment amount. As the pigment amount is increased, the peak height smoothly increases from zero and bends over as additional increments of pigment contribute less to the fluorescence.

Example 9

Co-Pigments Using Two NIR Fluorescent Pigments

Figure 21:
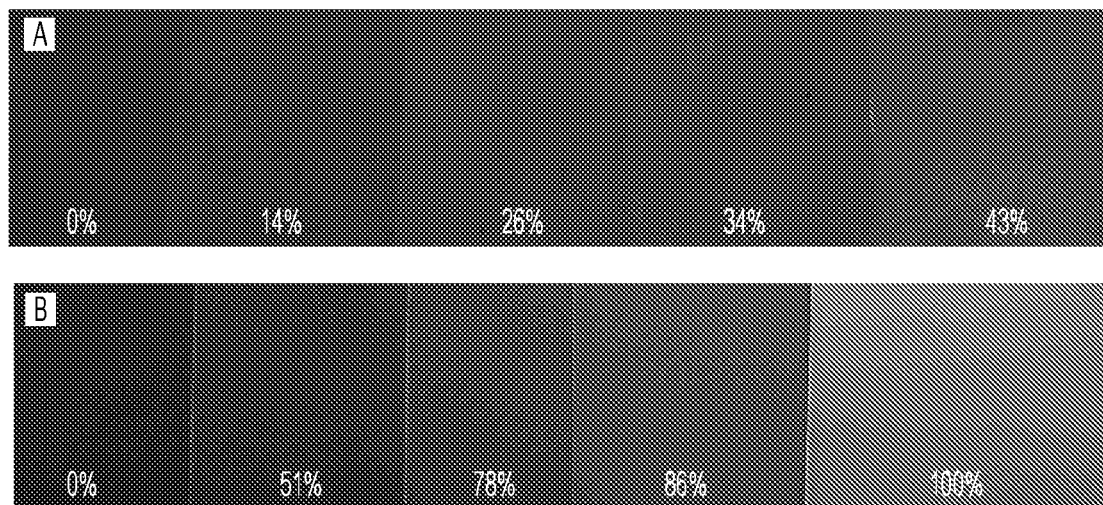
FIG. 21 shows A) substrates coated with dark brown PVDF-based coatings with varying weight percentages of ruby pigment and B) substrates coated with black PVDF-based coatings with varying weight percentages of Han Blue pigment.

Coating formulations were prepared using two scaled-up NIR fluorescent pigments. Two NIR fluorescent pigments (ruby and Han Blue) were formulated into two PVDF-based coatings. The first coating was dark brown as ruby was incorporated into this formula at weight percentages ranging from 14% to 43% (FIG. 21A). The second coating was black as Han Blue was formulated into this coating from 51% to 86% by weight (FIG. 21B). ESR measurements were conducted on these coatings. Measurements were made on a control brown PVDF-based coating reference sample, and on a sample which contained 43% ruby pigment. Spectrometer measurements indicated that the solar reflectance values were 0.264 and 0.331, respectively. Fluorescence measurements on the ruby sample did show characteristic ruby fluorescence, but the amount was one or two orders of magnitude lower than ruby without other pigments. The ESR measurements yielded 0.256 and 0.325, both values deviating from the spectrometer measurements by less than 0.010.

Figure 22:
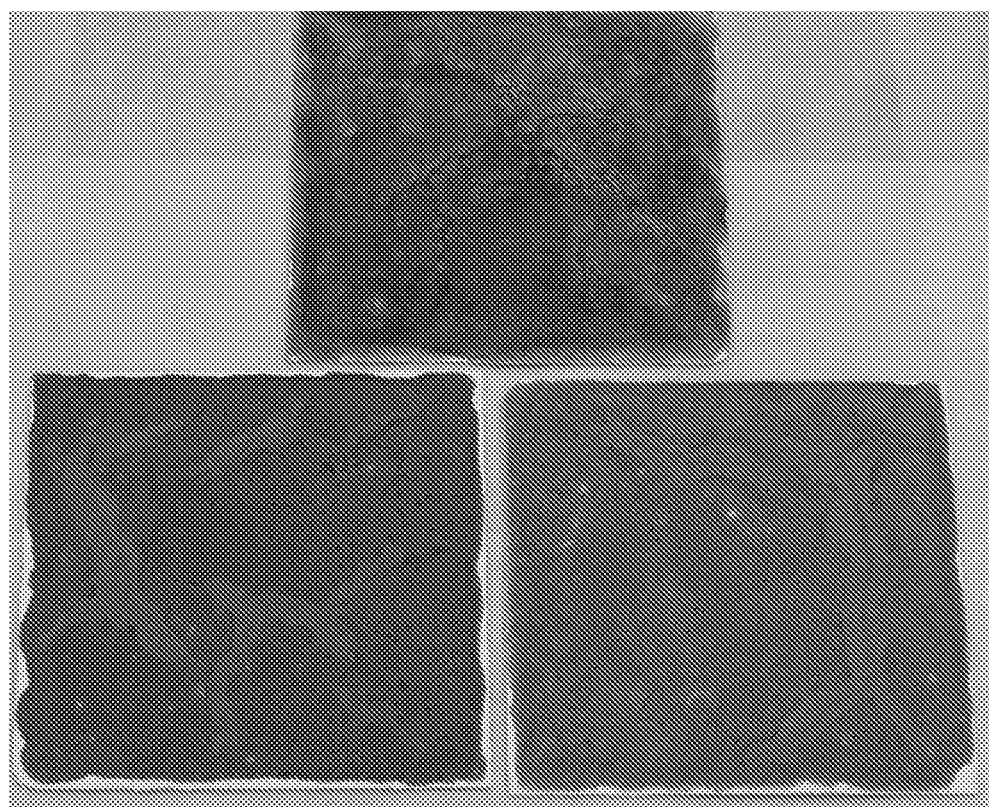
FIG. 22 shows coatings including $Sr(La,Li)CuSi_4O_{10}$ (Top), $Sr(La,Li)CuSi_4O_{10}$ with azo yellow (Bottom left) and $Sr(La,Li)CuSi_4O_{10}$ with Shepherd yellow 193 (Bottom right)
Figure 23:
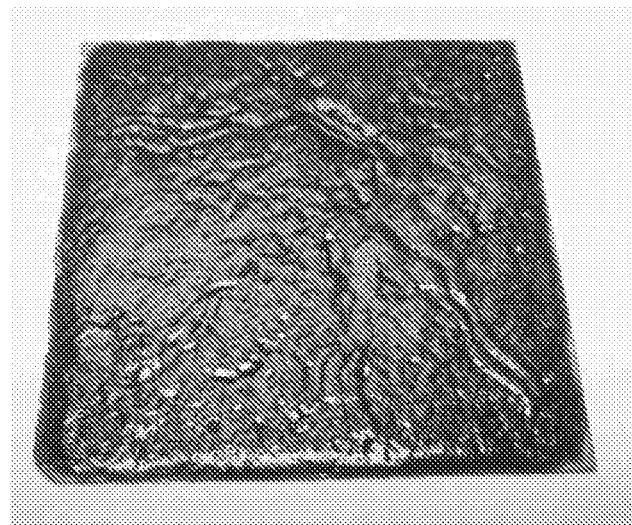
FIG. 23 shows a photograph of a blue-shade black sample made with a $SrCuSi_4O_{10}$ (large) pigmented acrylic coating over orange over a bright white substrate.

$SrCuSi_4O_{10}$ (large particles) was mixed with yellow (an organic yellow pigment, Liquitex "azo" yellow-orange (Diarylide yellow, PY83 HR70), and a mixed metal oxide, Shepherd 193) to make NIR fluorescent green coatings. FIG. 22 shows coatings including $Sr(La,Li)CuSi_4O_{10}$ (Top), $Sr(La,Li)CuSi_4O_{10}$ with azo yellow (Bottom left) and $Sr(La,Li)CuSi_4O_{10}$ with Shepherd yellow 193 (Bottom right). In both cases fluorescence was similar to that of the blue alone (Table 7). FIG. 23 shows a photograph of the blue-shade black sample made with a $SrCuSi_4O_{10}$ (large) pigmented acrylic coating over orange over a bright white substrate. The orange was a Liquitex cadmium light red hue (imitation) with one brushed coating, which had an ESR of 0.451. The spectrometer reflectance was 0.14 in the blue at 450 nm, 0.07 in the center of the visible (green) at 550 nm and 0.10 in the red at 650 nm. Thus this sample was nearly black.

Example 10

Co-Pigments Using NIR Fluorescent Pigments and IR Reflective Pigments

A control mocha PPG Duranar® coil coating was prepared by blending PPG Duranar® clear, IR reflective black, flatting slurry, red, white and yellow tint pastes to achieve the desired color.

An experimental mocha PPG Duranar® coil coating was prepared using NIR fluorescent pigments and IR reflective pigments. A blue tint paste comprising NIR fluorescent Han blue and an orange tint paste comprising IR reflective Orange 10C341 were prepared in a Duranar® formula. The blue and orange tint pastes were mixed to attain the same color as the control mocha coating. The experimental mocha coating and control mocha coating are shown side-by-side in FIG. 24.

The substrates used for this evaluation were chrome primed aluminum substrates, which were coated with a white PPG Duranar® coating. The experimental and control mocha Duranar® coatings were coated onto the substrates and cured at 480° F. for 30 seconds to reach a final film thicknesses of 74 micrometers.

Figure 24:
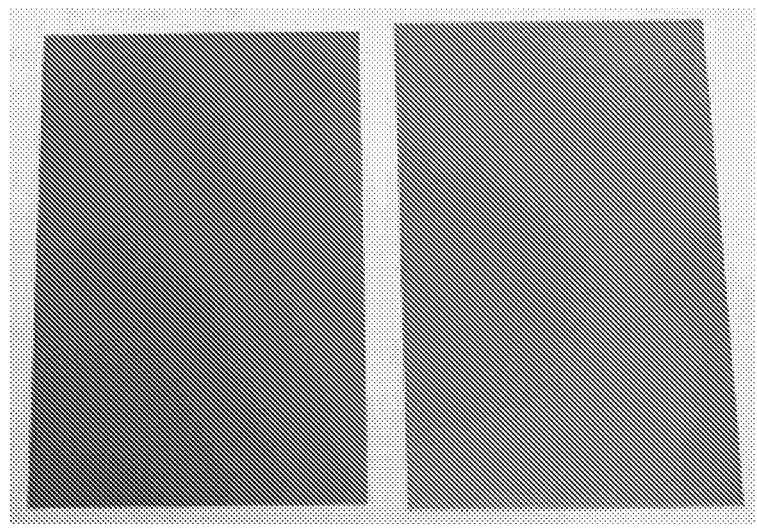
FIG. 24 shows Left: a coating containing NIR fluorescent pigment (Han blue pigment) and IR reflective pigment (Shepherd 10C341)—Right: a coating containing IR reflective pigment (Shepherd 10C341)
Figure 25:
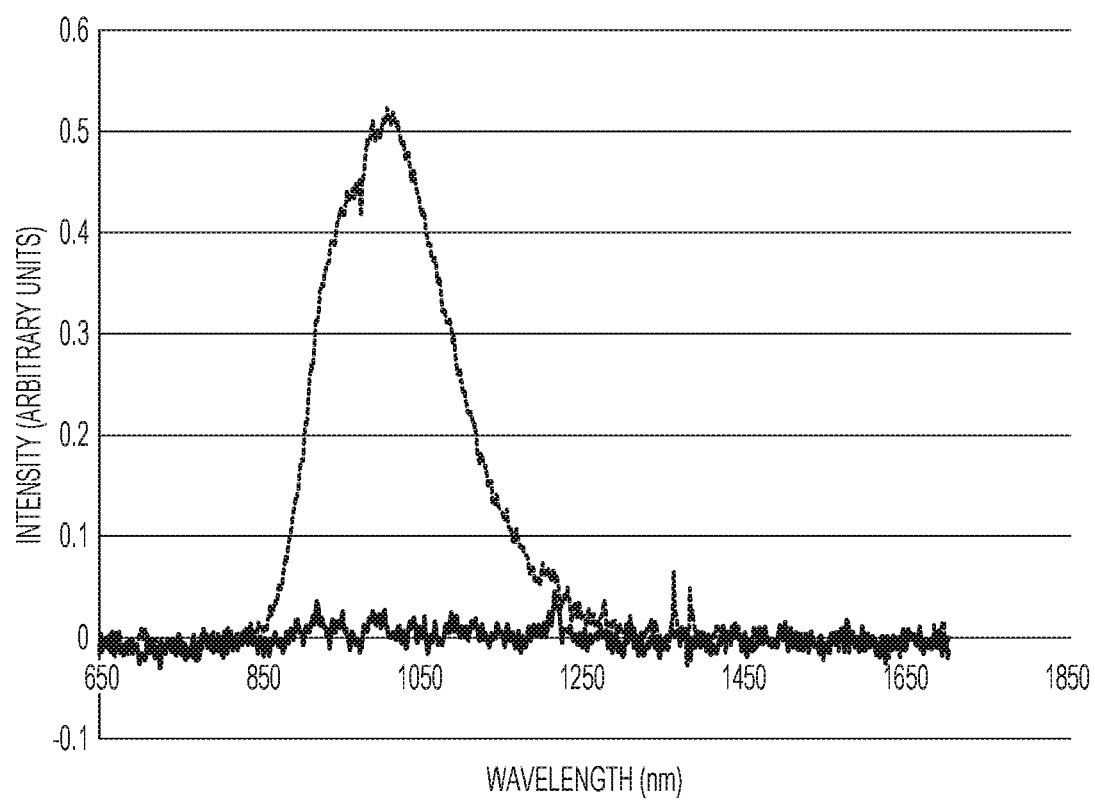
FIG. 25 shows NIR fluorescence spectra of a coating containing MR fluorescent blue/IR reflective orange and a coating containing IR reflective pigments.

NIR fluorescence measurements conducted on coated substrates shown in FIG. 24 indicated that the experimental mocha coating containing NIR fluorescent Han blue and IR reflective orange displayed NIR fluorescence (when excited at 600 nm), while the control mocha coating containing only IR reflective pigments did not exhibit any fluorescence (when excited at 600 nm) (FIG. 25).

The dashed curve of FIG. 25 is for the experimental mocha coating containing NIR fluorescent pigment and IR reflective pigment. The solid curve of FIG. 25 is for the control mocha coating containing IR reflective pigment. The excitation wavelength was 600 nm. The emission measurement range was from 650 nm to 1700 nm. NIR fluorescence measurements were conducted with a PTI QM-500 QuantaMaster™ NIR spectrofluorometer equipped with an InGaAs detector.

To determine the cooling benefit of the experimental mocha coating, both the control mocha coating and the experimental mocha coating were placed under heat lamps for the same amount of time. The surfaces of the coated

TABLE 7

Solar reflectance and effective solar reflectance data for 'green' coatings prepared using different yellow pigments along with Blue 4 - Lot 2

| Pigments in coatings | Solar reflectance (AM1GH) | Solar reflectance (ESR) | Benefit from fluorescence | Reflectance (550 nm) | Substrate | Blue pigment amount (g/m²)[8] |
|---|---|---|---|---|---|---|
| #193 yellow[6] (buff) + Sr(La,Li)CuSi₄O₁₀ | 0.382 | 0.486 | 0.104 | 0.24 | Bright white | 90 |
| Azo yellow[7] + Sr(La,Li)CuSi₄O₁₀ | 0.338 | 0.479 | 0.141 | 0.26 | Bright white | 130 |
| Sr(La,Li)CuSi₄O₁₀ | 0.405 | 0.498 | 0.093 | 0.173 | Bright white | 100 |

[6]Available from The Shepard Color Company (Cincinnati, OH).
[7]Diarylide yellow, PY83 HR70.
[8]Amount of pigment per unit area.

substrates were monitored over a 10-minute period. The experimental mocha coating, which contained both NIR fluorescent Han blue and IR reflective orange was consistently 10 degrees cooler than the coating from the control mocha coating, which contained IR reflective black. Upon reaching equilibrium, the temperature of the coating surface of the experimental mocha coating was 160° F., while the temperature of the control mocha coating surface was 170° F.

Example 11

Accelerated Testing, Outdoor Exposure and Thermal Measurements

In addition to conducting weathering studies, thermal measurements were conducted by using a portable field testing station to evaluate the performance of coatings containing NIR fluorescent pigments. The portable field testing station is equipped with a pyranometer, anemometer, wind vane, and thermocouples (samples are on R4 foam insulation). The DataTaker™ 500 is capable of measuring up to eight samples (3"×3") along with an ambient sensor.

Figure 26:
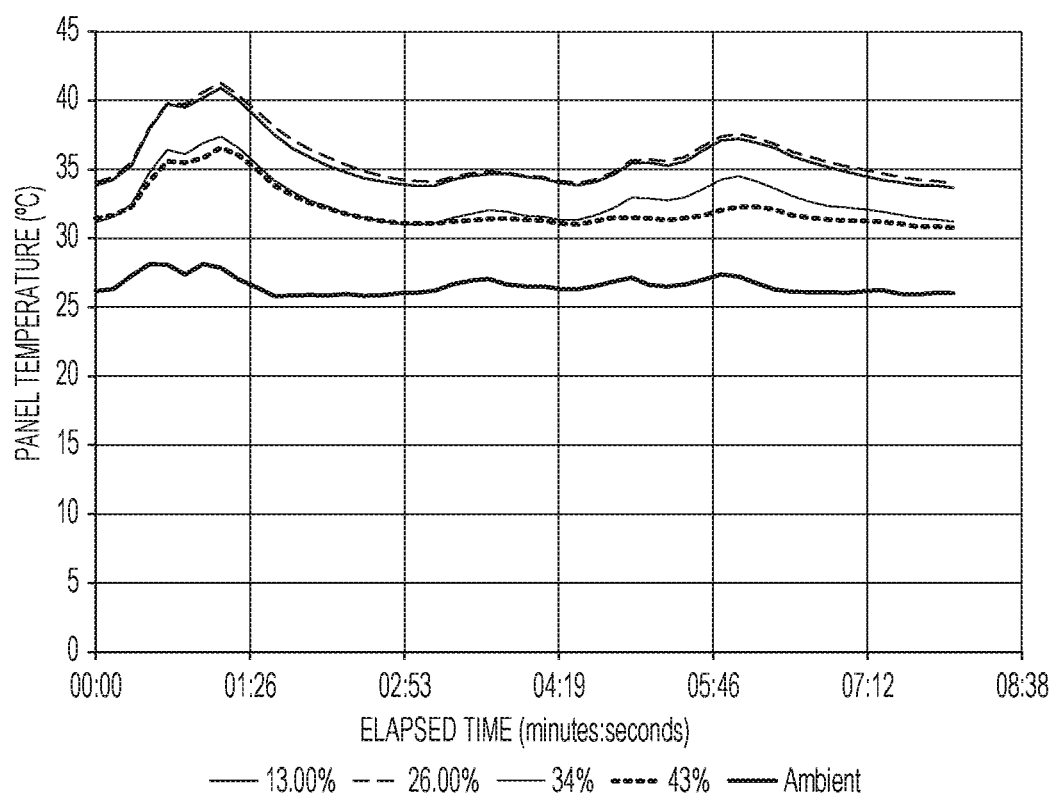
FIG. 26 shows a plot of thermal measurements conducted on several coatings containing varying levels of NIR fluorescent ruby pigment.

Thermal measurements, were conducted on a series of coated substrates using the field station. The brown coatings evaluated contained varying levels of ruby pigment (14-43% by weight) and a brown co-pigment. While ESR measurements were not conducted, temperature measurements of the panels were made (FIG. 26). The coatings with ruby pigment levels more than 30% by weight were about 4-5° C. cooler than coatings containing less than 30% ruby pigment.

The present invention further includes the subject matter of the following clauses.

Clause 1: A coating composition comprising: (i) a film-forming resin; (ii) an infrared reflective pigment; and (iii) an infrared fluorescent pigment different from the infrared reflective pigment, wherein, when the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment.

Clause 2: The coating composition of clause 1, wherein, when the coating composition is cured to form a coating and exposed to the radiation comprising fluorescence-exciting radiation, the coating has an ESR of at least 0.25.

Clause 3: The coating composition of clause 1 or 2, wherein, when the coating composition is cured to form a coating and exposed to the radiation comprising fluorescence-exciting radiation, a temperature of the coating at a time (µl) after being exposed to the radiation comprising fluorescence-exciting radiation is lower compared to the same coating exposed to the radiation comprising fluorescence-exciting radiation except without the infrared fluorescent pigment at the time (t1) after being exposed to the radiation comprising fluorescence-exciting radiation.

Clause 4: The coating composition of any of clauses 1 to 3, further comprising a colorant.

Clause 5: The coating composition of any of clauses 1 to 4, wherein the radiation comprising fluorescence-exciting radiation is produced from sunlight, incandescent light, fluorescent light, xenon light, laser, LED light, or a combination thereof.

Clause 6: The coating composition of any of clauses 1 to 5, wherein the infrared reflective pigment reflects at a first wavelength and the infrared fluorescent pigment fluoresces at a second wavelength, and wherein a balance of the coating composition is transparent at the first wavelength and second wavelength.

Clause 7: The coating composition of any of clauses 1 to 6, wherein the infrared fluorescent pigment comprises Han purple, Han blue, Egyptian blue, ruby, cadmium pigment, CdSe and CdTe compounds, zirconia red, indigo, blue verditer, copper blue, azurite, ploss blue, smalt, or a combination thereof.

Clause 8: The coating composition of any of clauses 1 to 7, wherein the infrared fluorescent pigment absorbs visible radiation.

Clause 9: The coating composition of any of clauses 1 to 8, wherein the absorbed visible radiation comprises a dark color.

Clause 10: A multi-layer coating comprising: (i) a first coating layer comprising a cured infrared reflective coating composition; and (ii) a second coating layer overlaying at least a portion of the first coating layer, the second coating layer comprising a cured coating composition according to any of clauses 1 to 9.

Clause 11: A substrate at least partially coated with the material of any of clauses 1 to 10.

Clause 12: The substrate of clause 11, wherein the substrate comprises at least a portion of a building substrate.

Clause 13: The substrate of clause 12, wherein the building substrate comprises at least a portion of an exterior panel, roofing material, or industrial substrate.

Clause 14: The substrate of any of clauses 11 to 13, wherein the substrate comprises a metallic or non-metallic portion.

Clause 15: A method of reducing the temperature of an article comprising: (a) applying a coating composition to at least a portion of a surface of an article, the coating composition comprising (i) a film-forming resin, (ii) an infrared reflective pigment, and (iii) an infrared fluorescent pigment different from the infrared reflective pigment; and (b) curing the coating composition to form a coating on the article, wherein, when the coating composition is cured to form a coating and exposed to radiation comprising fluorescence-exciting radiation, the coating has a greater effective solar reflectance (ESR) compared to the same coating exposed to the radiation comprising fluorescence-exciting radiation except without the infrared fluorescent pigment.

Clause 16: The method of clause 15, wherein, when the coating composition is cured to form a coating and exposed to the radiation comprising fluorescence-exciting radiation, the coating has an ESR of at least 0.25.

Clause 17: The method of clause 15 or 16, wherein, when the coating composition is cured to form a coating and exposed to the radiation comprising fluorescence-exciting radiation, a temperature of the coating at a time (t1) after being exposed to the radiation comprising fluorescence-exciting radiation is lower compared to the same coating exposed to the radiation comprising fluorescence-exciting radiation except without the infrared fluorescent pigment at the time (t1) after being exposed to the radiation comprising fluorescence-exciting radiation.

Clause 18: The method of any of clauses 15 to 17, wherein the radiation comprising fluorescence-exciting radiation is produced from sunlight, incandescent light, fluorescent light, xenon light, laser, LED light, or a combination thereof.

Clause 19: The method of any of clauses 15 to 18, wherein the article comprises at least a portion of a building substrate.

Clause 20: The method of clause 19, wherein the building substrate comprises at least a portion of an exterior panel, roofing material, or industrial substrate.

Clause 21: The coating composition of any of clauses 1 to 9, wherein the infrared fluorescent pigment comprises $SrCuSi_4O_{10}$, $Sr(La, Li)CuSi_4Si_4O_{10}$, $Ba(La, Li)CuSi_4O_{10}$, or a combination thereof.

Clause 22: The coating composition of any of clauses 1 to 9, further comprising an infrared transparent pigment.

Clause 23: The coating composition of any of clauses 1 to 9, wherein the infrared fluorescent pigment fluoresces in the near-infrared region of the electromagnetic spectrum when excited by the radiation comprising fluorescence-exciting radiation.

Whereas particular embodiments of this invention have been described above for purposes of illustration, it will be evident to those skilled in the art that numerous variations of the details of the present invention may be made without departing from the invention.

The invention claimed is:

1. A multi-layer coating comprising:
  a first coating layer comprising a cured infrared reflective coating composition; and
  a second coating layer overlaying at least a portion of the first coating layer, the second coating layer comprising a cured coating composition, wherein the coating composition comprises:
  a film-forming resin;
  an infrared reflective pigment; and
  an infrared fluorescent pigment different from the infrared reflective pigment,
  wherein the infrared fluorescent pigment comprises an alkaline earth copper silicate, $Sr(La, Li)CuSi_4Si_4O_{10}$, $Ba(La, Li)CuSi_4O_{10}$, ruby, azurite $(Cu_3(CO_3)_2(OH)_2)$, ploss blue, smalt, or a combination thereof, wherein the alkaline earth copper silicate is selected from the group consisting of Egyptian blue $(CaCuSi_4O_{10})$, Han blue $(BaCuSi_4O_{10})$, Han purple $(BaCuSi_2O_6)$, $SrCuSi_4O_{10}$, and combinations thereof,
  wherein the infrared fluorescent pigment has an average particle size of from 100 nm to 10 microns,
  wherein the coating composition is substantially free of infrared fluorescent pigments having an average particle size of more than 10 microns,
  wherein the infrared reflective pigment reflects at a first wavelength and the infrared fluorescent pigment fluoresces at a second wavelength,
  wherein the infrared reflective pigment does not substantially absorb the second wavelength,
  wherein the balance of the coating composition is transparent at the first wavelength and the second wavelength, and
  wherein, when the coating composition is cured to form a coating and exposed to the radiation comprising fluorescence-exciting radiation, the coating has an effective solar reflectance (ESR) of at least 0.25.

2. The multi-layer coating of claim 1, wherein, when the coating composition is cured to form a coating and exposed to the radiation comprising fluorescence-exciting radiation, a temperature of the coating at a time ($t_1$) after being exposed to the radiation comprising fluorescence-exciting radiation is lower compared to the same coating exposed to the radiation comprising fluorescence-exciting radiation except without the infrared fluorescent pigment at the time ($t_1$) after being exposed to the radiation comprising fluorescence-exciting radiation.

3. The multi-layer coating of claim 1, further comprising a colorant.

4. The multi-layer coating of claim 1, wherein the radiation comprising fluorescence-exciting radiation is produced from sunlight, incandescent light, fluorescent light, xenon light, laser, LED light, or a combination thereof.

5. The multi-layer coating of claim 1, wherein the infrared fluorescent pigment absorbs visible radiation.

6. The multi-layer coating of claim 1, wherein the infrared fluorescent pigment absorbs visible radiation such that the coating composition exhibits a dark color.

7. The multi-layer coating of claim 1, wherein the infrared reflective pigment and the infrared fluorescent pigment each comprise from 1 to 40 weight % of the coating composition, based on total solids weight of the coating composition.

8. The multi-layer coating of claim 1, wherein the infrared fluorescent pigment fluoresces in the near-infrared region.

9. A substrate at least partially coated with the multi-layer coating of claim 1.

10. The substrate of claim 9, wherein the substrate comprises at least a portion of a building substrate.

11. The substrate of claim 10, wherein the building substrate comprises at least a portion of an exterior panel, roofing material, or industrial substrate.

12. The substrate of claim 9, wherein the substrate comprises a metallic or non-metallic portion.

13. A method of reducing the temperature of an article comprising:
  applying a coating composition to at least a portion of a surface of an article, the coating composition comprising (i) a film-forming resin, (ii) an infrared reflective pigment, and (iii) an infrared fluorescent pigment different from the infrared reflective pigment; and
  curing the coating composition to form a coating on the article,
  wherein the infrared fluorescent pigment comprises an alkaline earth copper silicate, $Sr(La, Li)CuSi_4O_{10}$, $Ba(La, Li)CuSi_4O_{10}$, ruby, azurite $(Cu_3(CO_3)_2(OH)_2)$, ploss blue, smalt, or some combination thereof, wherein the alkaline earth copper silicate is selected from the group consisting of Egyptian blue $(CaCuSi_4O_{10})$, Han blue $(BaCuSi_4O_{10})$, Han purple $(BaCuSi_2O_6)$, $SrCuSi_4O_{10}$, and combinations thereof,
  wherein the infrared reflective pigment and the infrared fluorescent pigment each comprise from 1 to 40 weight % of the coating composition, based on total solids weight of the coating composition, wherein the infrared reflective pigment and the infrared fluorescent pigment are included in the coating composition in an effective amount such that, when the coating composition is cured to form a coating and exposed to the radiation comprising fluorescence-exciting radiation, the coating has an effective solar reflectance (ESR) of at least 0.25.

14. The method of claim 13, wherein, when the coating composition is cured to form a coating and exposed to the radiation comprising fluorescence-exciting radiation, a temperature of the coating at a time ($t_1$) after being exposed to the radiation comprising fluorescence-exciting radiation is lower compared to the same coating exposed to the radiation comprising fluorescence-exciting radiation except without the infrared fluorescent pigment at the time ($t_1$) after being exposed to the radiation comprising fluorescence-exciting radiation.

15. The method of claim 13, wherein the radiation comprising fluorescence-exciting radiation is produced from sunlight, incandescent light, fluorescent light, xenon light, laser, LED light, or a combination thereof.

16. The method of claim 13, wherein the article comprises at least a portion of a building substrate.

17. The method of claim 16, wherein the building substrate comprises at least a portion of an exterior panel, roofing material, or industrial substrate.

\* \* \* \* \*